(12) United States Patent
Hirzallah et al.

(10) Patent No.: US 12,461,189 B2
(45) Date of Patent: Nov. 4, 2025

(54) USER EQUIPMENT (UE)-BASED RADIO FREQUENCY FINGERPRINT (RFFP) POSITIONING WITH DOWNLINK POSITIONING REFERENCE SIGNALS

(71) Applicant: QUALCOMM Incorporated, San Diego, CA (US)

(72) Inventors: Mohammed Ali Mohammed Hirzallah, San Diego, CA (US); Xiaoxia Zhang, San Diego, CA (US); Roohollah Amiri, San Diego, CA (US); Srinivas Yerramalli, San Diego, CA (US); Marwen Zorgui, San Diego, CA (US); Mohammad Tarek Fahim, San Diego, CA (US); Taesang Yoo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/661,534

(22) Filed: Apr. 29, 2022

(65) Prior Publication Data

US 2023/0350002 A1 Nov. 2, 2023

(51) Int. Cl.
*G01S 5/02* (2010.01)
*H04W 4/029* (2018.01)

(52) U.S. Cl.
CPC ........ *G01S 5/02525* (2020.05); *G01S 5/0236* (2013.01); *G01S 5/0278* (2013.01); *H04W 4/029* (2018.02)

(58) Field of Classification Search
CPC .. G01S 5/02525; G01S 5/0236; G01S 5/0278; H04W 4/029
See application file for complete search history.

(56) References Cited

U.S. PATENT DOCUMENTS 11,181,903 B1 * 11/2021 Powers ............... G08G 5/22
2010/0303129 A1  12/2010 Huang et al.
(Continued)

FOREIGN PATENT DOCUMENTS

EP           3399326 A1    11/2018
WO    WO-2015018484 A1 *  2/2015  .............. H04W 8/22
(Continued)

OTHER PUBLICATIONS

International Search Report and Written Opinion—PCT/US2023/015521—ISA/EPO—Jun. 23, 2023.
(Continued)

*Primary Examiner* — William Kelleher
*Assistant Examiner* — Noah Yi Min Zhu
(74) *Attorney, Agent, or Firm* — QUALCOMM Incorporated

(57) ABSTRACT

Disclosed are techniques for wireless communication. In an aspect, a user equipment (UE) transmits one or more provide capabilities messages to a location server, the one or more provide capabilities messages indicating at least a first set of capabilities of the UE to engage in a downlink radio frequency fingerprint (DL-RFFP) positioning procedure, and receives one or more positioning assistance data messages for the DL-RFFP positioning procedure from the location server, the one or more positioning assistance data messages based at least on the first set of capabilities.

48 Claims, 21 Drawing Sheets

(56) References Cited

U.S. PATENT DOCUMENTS

| | | | |
|---|---|---|---|
| 2012/0040687 A1* | 2/2012 | Siomina | G01S 5/019 |
| | | | 455/422.1 |
| 2012/0082091 A1 | 4/2012 | Siomina et al. | |
| 2019/0049548 A1* | 2/2019 | Miller | H04B 17/345 |
| 2019/0090096 A1* | 3/2019 | Ivanov | H04W 4/30 |
| 2019/0363843 A1* | 11/2019 | Gordaychik | H04W 72/044 |
| 2020/0145977 A1* | 5/2020 | Kumar | H04W 56/001 |
| 2020/0267681 A1* | 8/2020 | Ferrari | H04W 64/00 |
| 2021/0029500 A1* | 1/2021 | Ye | H04W 4/029 |
| 2022/0053443 A1* | 2/2022 | Kim | H04W 56/00 |
| 2022/0264514 A1* | 8/2022 | Butt | G01S 5/0244 |
| 2023/0171836 A1* | 6/2023 | Butt | H04W 76/19 |
| | | | 370/216 |
| 2023/0292168 A1* | 9/2023 | Tomala | G06N 20/00 |
| 2023/0350001 A1 | 11/2023 | Hirzallah et al. | |
| 2023/0370457 A1* | 11/2023 | Alpert | H04L 63/0876 |
| 2024/0012087 A1* | 1/2024 | Pietraski | G01S 5/0252 |
| 2025/0048184 A1* | 2/2025 | Fujishiro | H04W 24/08 |

FOREIGN PATENT DOCUMENTS

| | | |
|---|---|---|
| WO | WO-2019240771 A1 * | 12/2019 |
| WO | 2022204627 | 9/2022 |

OTHER PUBLICATIONS

VIVO: "Discussion on Potential Positioning Enhancements", 3GPP TSG RAN WG1 #101, R1-2003429, 3rd Generation Partnership Project, Mobile Competence Centre, 650, Route Des Lucioles, F-06921 Sophia-Antipolis Cedex, France, vol. RAN WG1. No. e-Meeting, May 25, 2020-Jun. 5, 2020, May 16, 2020, XP051885215, 13 Pages.

VIVO: "Discussion on Potential Positioning Enhancements", 3GPP TSG RAN WG1 #103-e, R1-2007666, 3GPP, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 17, 2020, XP051939828, 49 Pages, paragraph [3.1.2], p. 30.

* cited by examiner

1300

Location Information Transfer Procedure

1350

Location Information Delivery Procedure

USER EQUIPMENT (UE)-BASED RADIO FREQUENCY FINGERPRINT (RFFP) POSITIONING WITH DOWNLINK POSITIONING REFERENCE SIGNALS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting one or more provide capabilities messages to a location server, the one or more provide capabilities messages indicating at least a first set of capabilities of the UE to engage in a downlink radio frequency fingerprint (DL-RFFP) positioning procedure; and receiving one or more positioning assistance data messages for the DL-RFFP positioning procedure from the location server, the one or more positioning assistance data messages based at least on the first set of capabilities.

In an aspect, a user equipment (UE) includes a memory: at least one transceiver; and at least one processor communicatively coupled to the memory and the at least one transceiver, the at least one processor configured to: transmit, via the at least one transceiver, one or more provide capabilities messages to a location server, the one or more provide capabilities messages indicating at least a first set of capabilities of the UE to engage in a downlink radio frequency fingerprint (DL-RFFP) positioning procedure; and receive, via the at least one transceiver, one or more positioning assistance data messages for the DL-RFFP positioning procedure from the location server, the one or more positioning assistance data messages based at least on the first set of capabilities.

In an aspect, a user equipment (UE) includes means for transmitting one or more provide capabilities messages to a location server, the one or more provide capabilities messages indicating at least a first set of capabilities of the UE to engage in a downlink radio frequency fingerprint (DL-RFFP) positioning procedure; and means for receiving one or more positioning assistance data messages for the DL-RFFP positioning procedure from the location server, the one or more positioning assistance data messages based at least on the first set of capabilities.

In an aspect, a non-transitory computer-readable medium stores computer-executable instructions that, when executed by a user equipment (UE), cause the UE to: transmit one or more provide capabilities messages to a location server, the one or more provide capabilities messages indicating at least a first set of capabilities of the UE to engage in a downlink radio frequency fingerprint (DL-RFFP) positioning procedure; and receive one or more positioning assistance data messages for the DL-RFFP positioning procedure from the location server, the one or more positioning assistance data messages based at least on the first set of capabilities.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
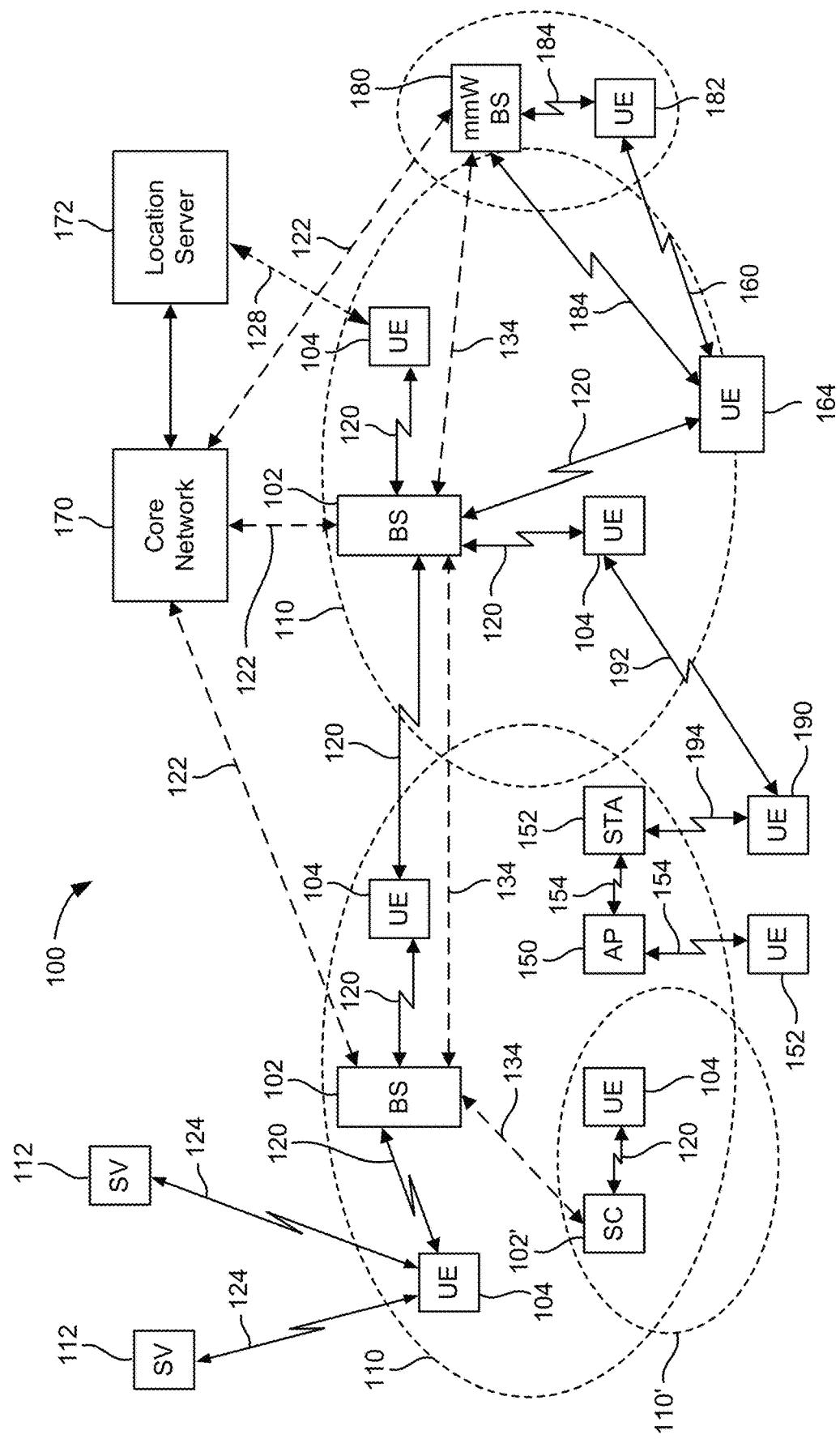
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array.") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
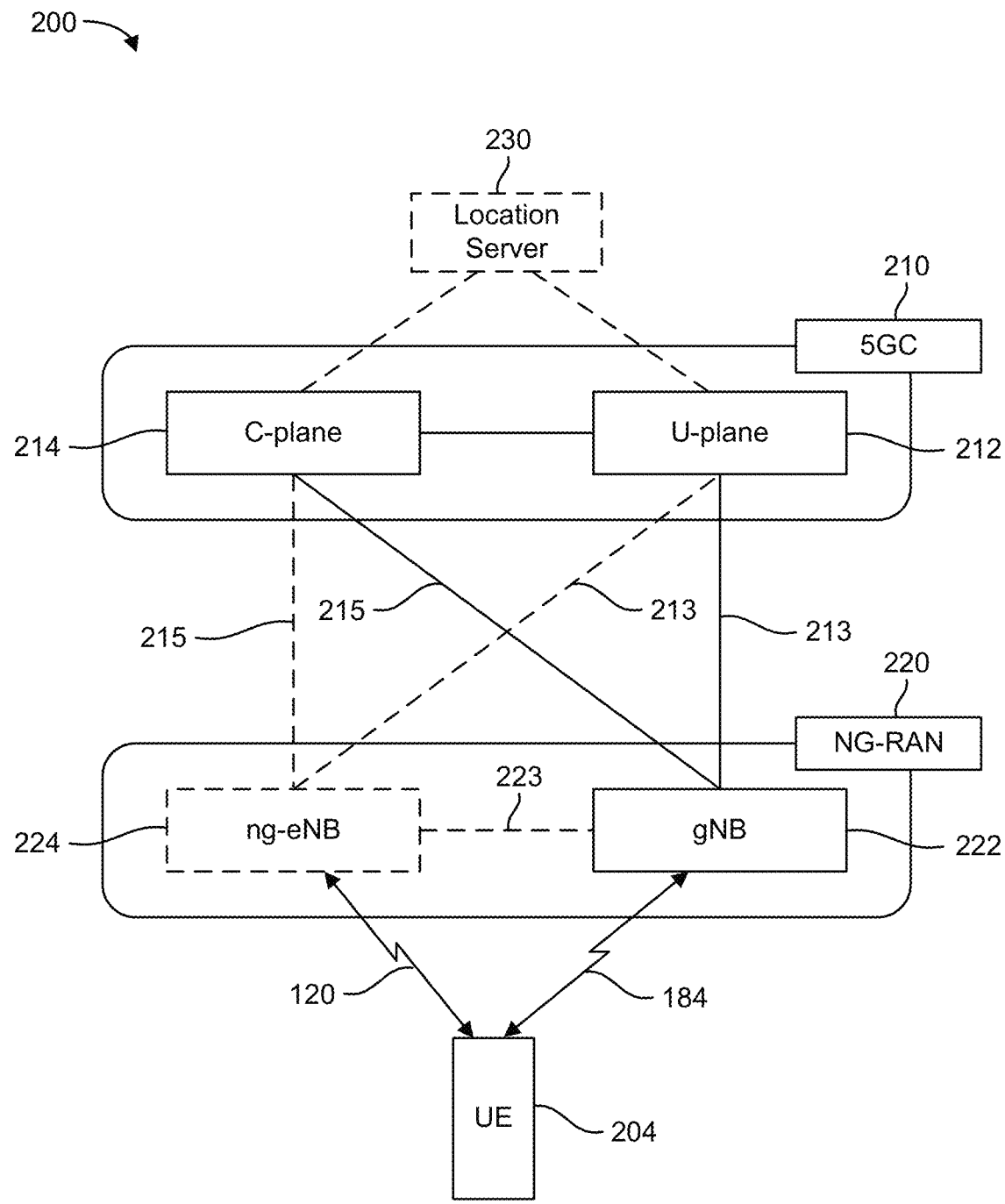
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
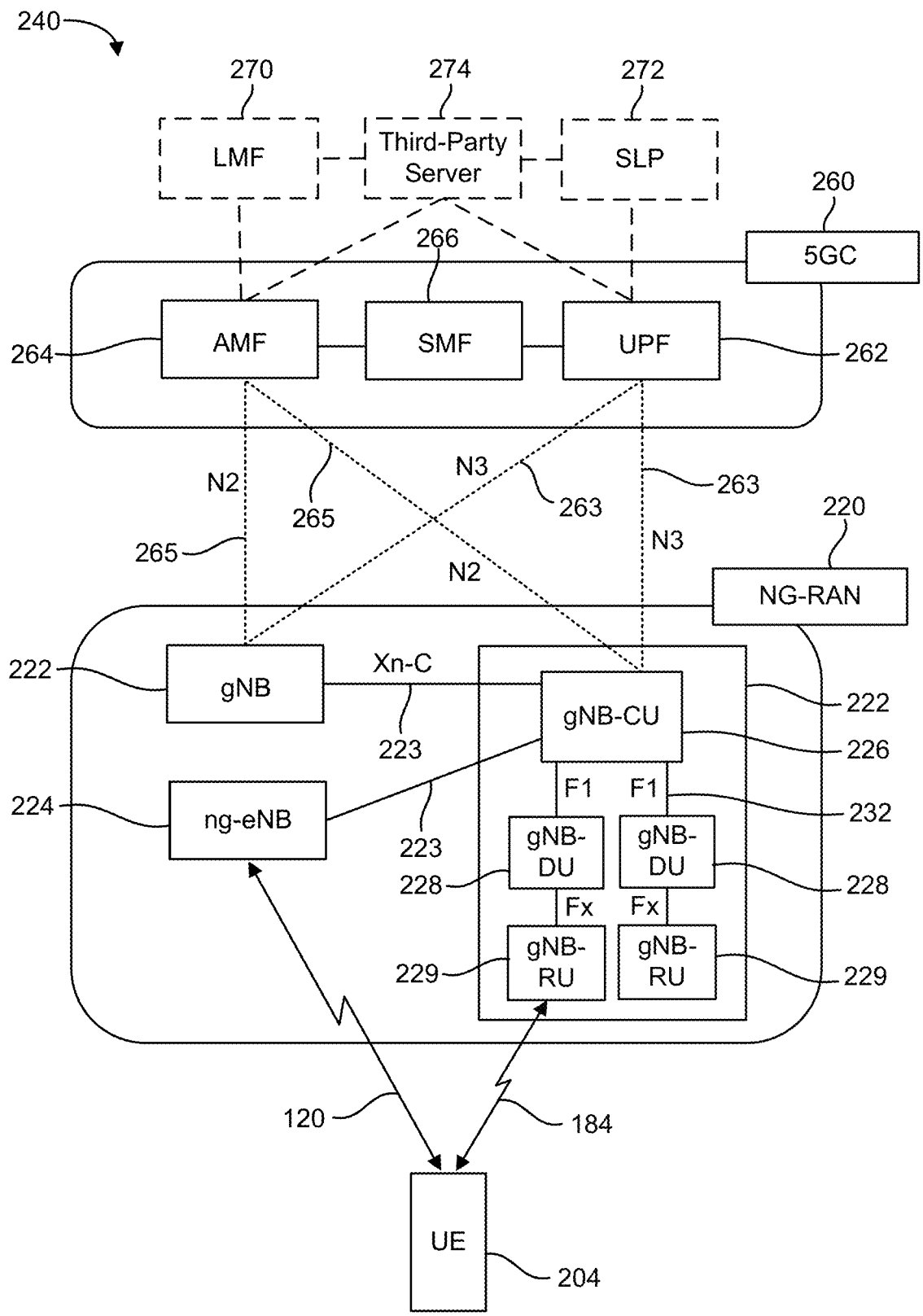

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220) and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270) can be configured to support one or more location services for UEs 204 that can connect to the LMF 270 via the core network, 5GC 260, and/or via the Internet (not illustrated). The SLP 272 may support similar functions to the LMF 270, but whereas the LMF 270) may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components)

performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
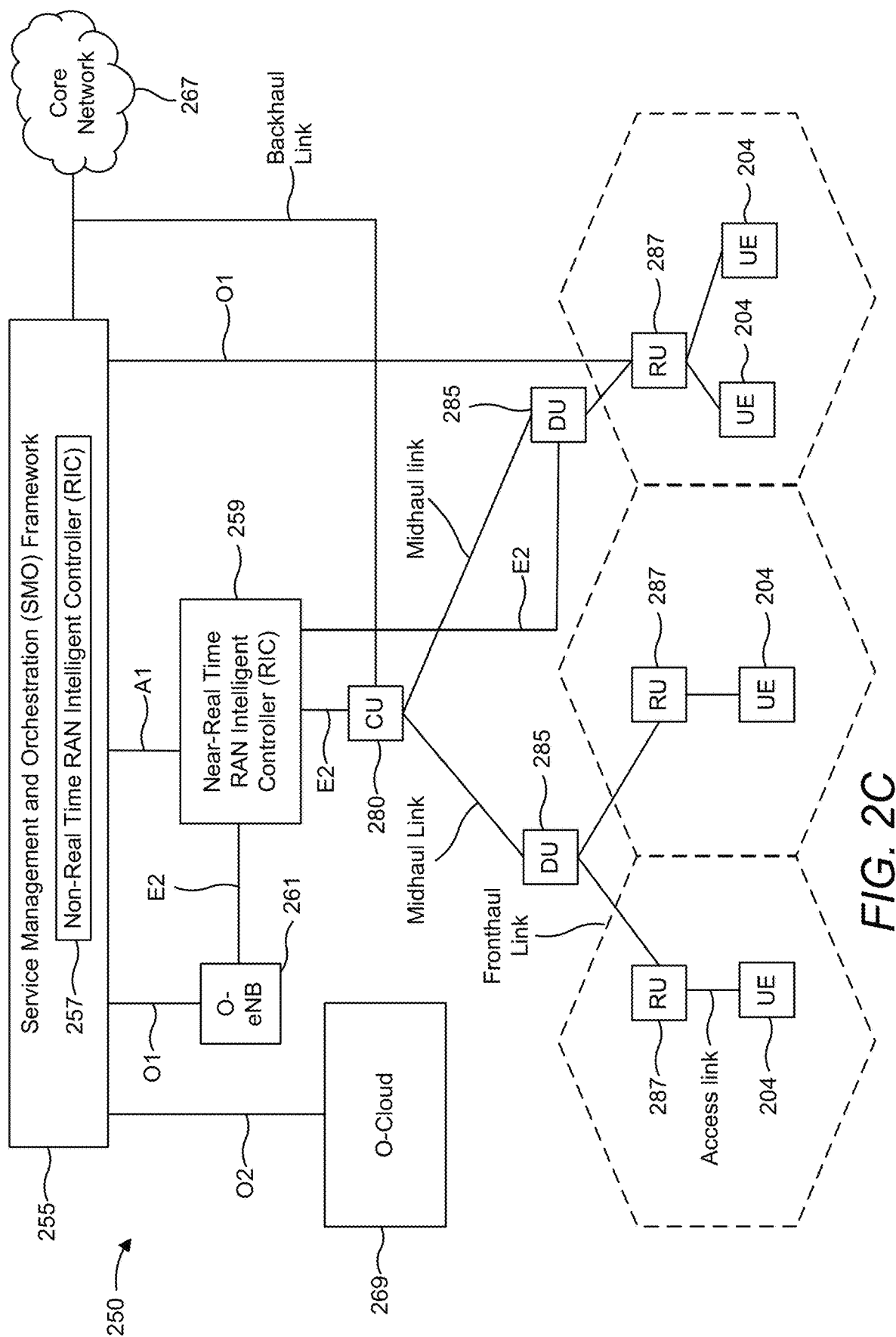

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
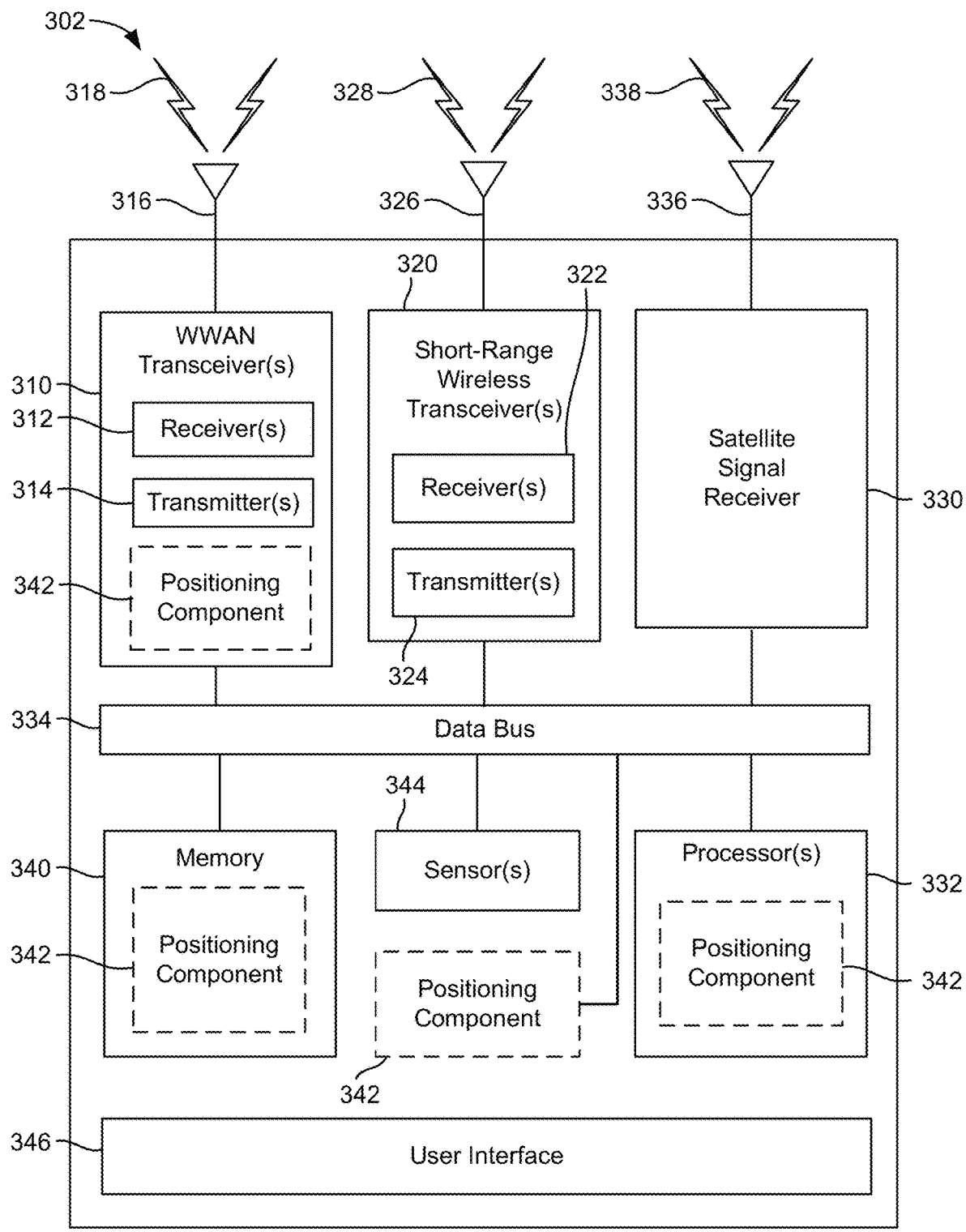
FIGS. 3A, 3B, and 3C are simplified block diagrams of several sample aspects of components that may be employed in a user equipment (UE), a base station, and a network entity, respectively, and configured to support communications as taught herein.
Figure 3B:
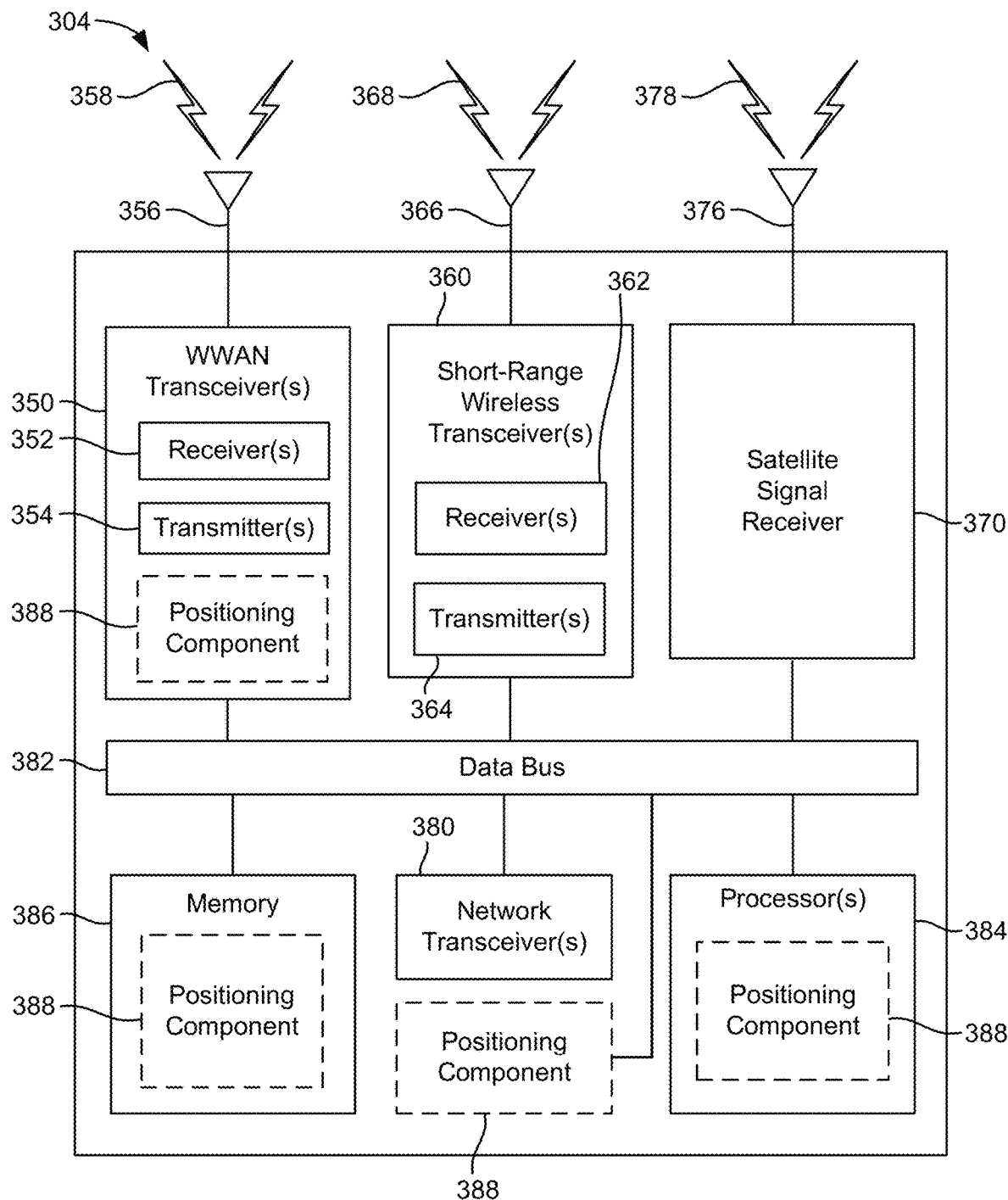
Figure 3C:
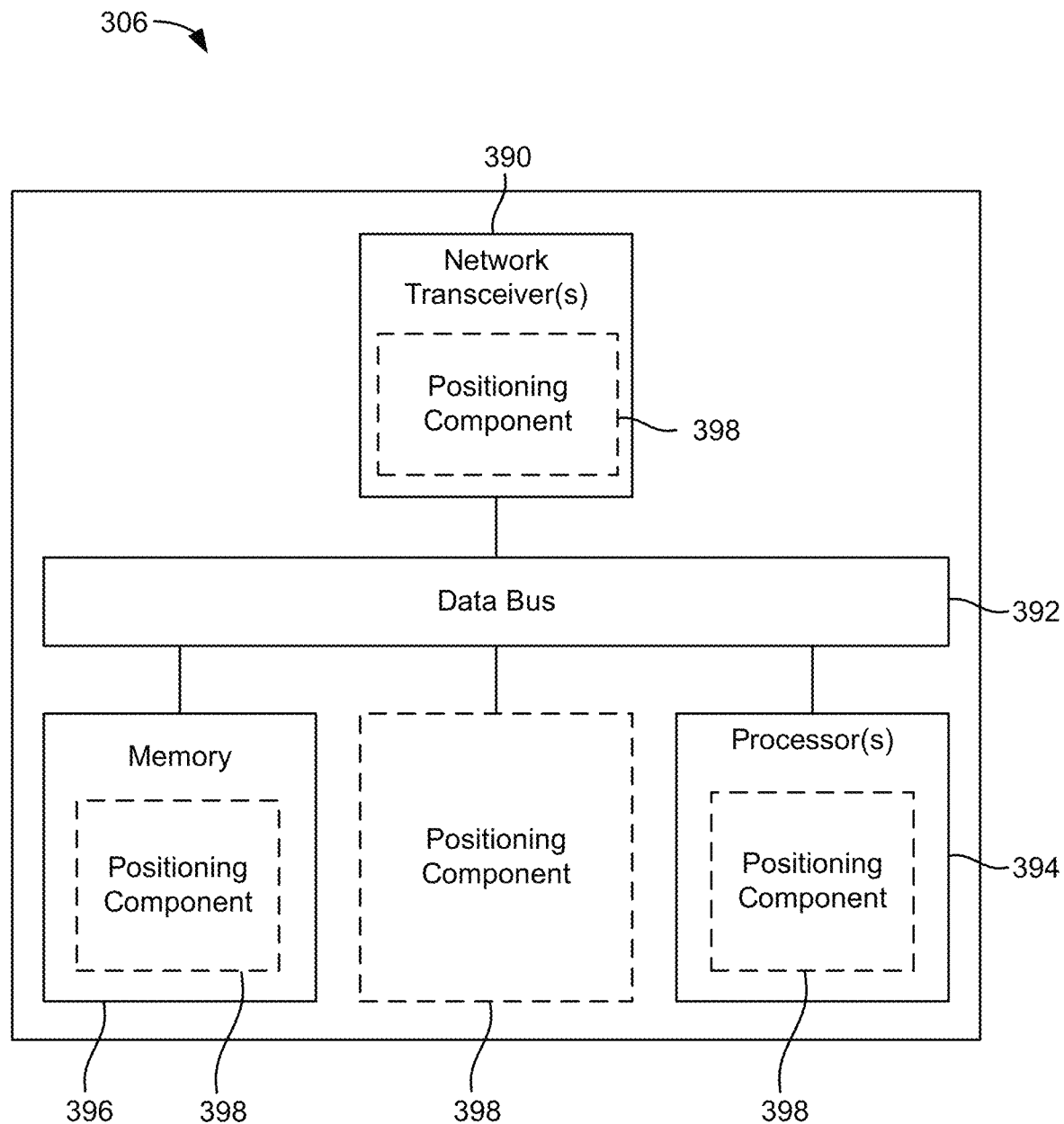

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
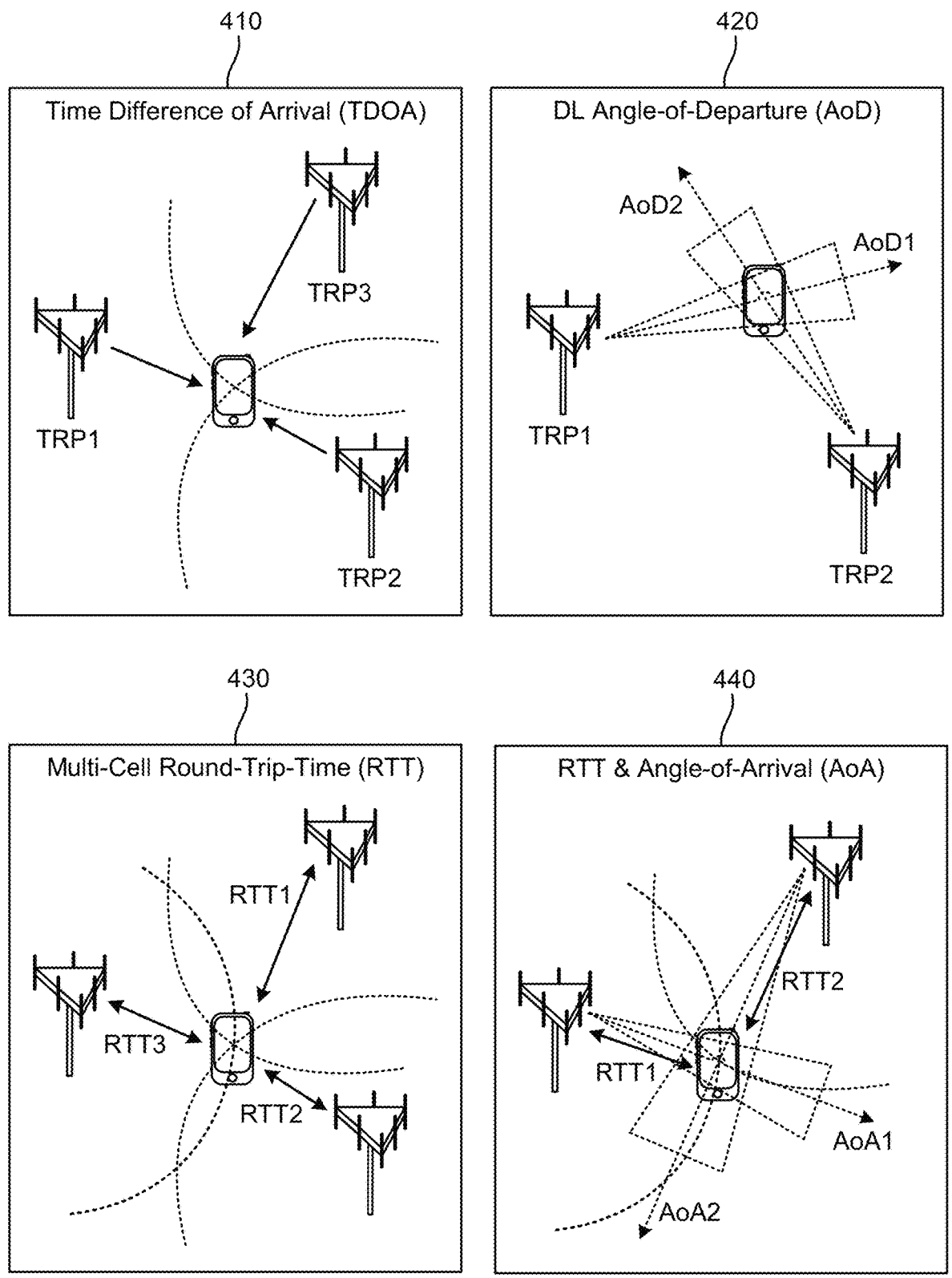
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds ($\mu$s). In some cases, when any of the resources used for the positioning measurement are in FR1, the value range for the uncertainty of the expected RSTD may be +/−32 $\mu$s. In other cases, when all of the resources used for the positioning measurement(s) are in FR2, the value range for the uncertainty of the expected RSTD may be +/−8 $\mu$s.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
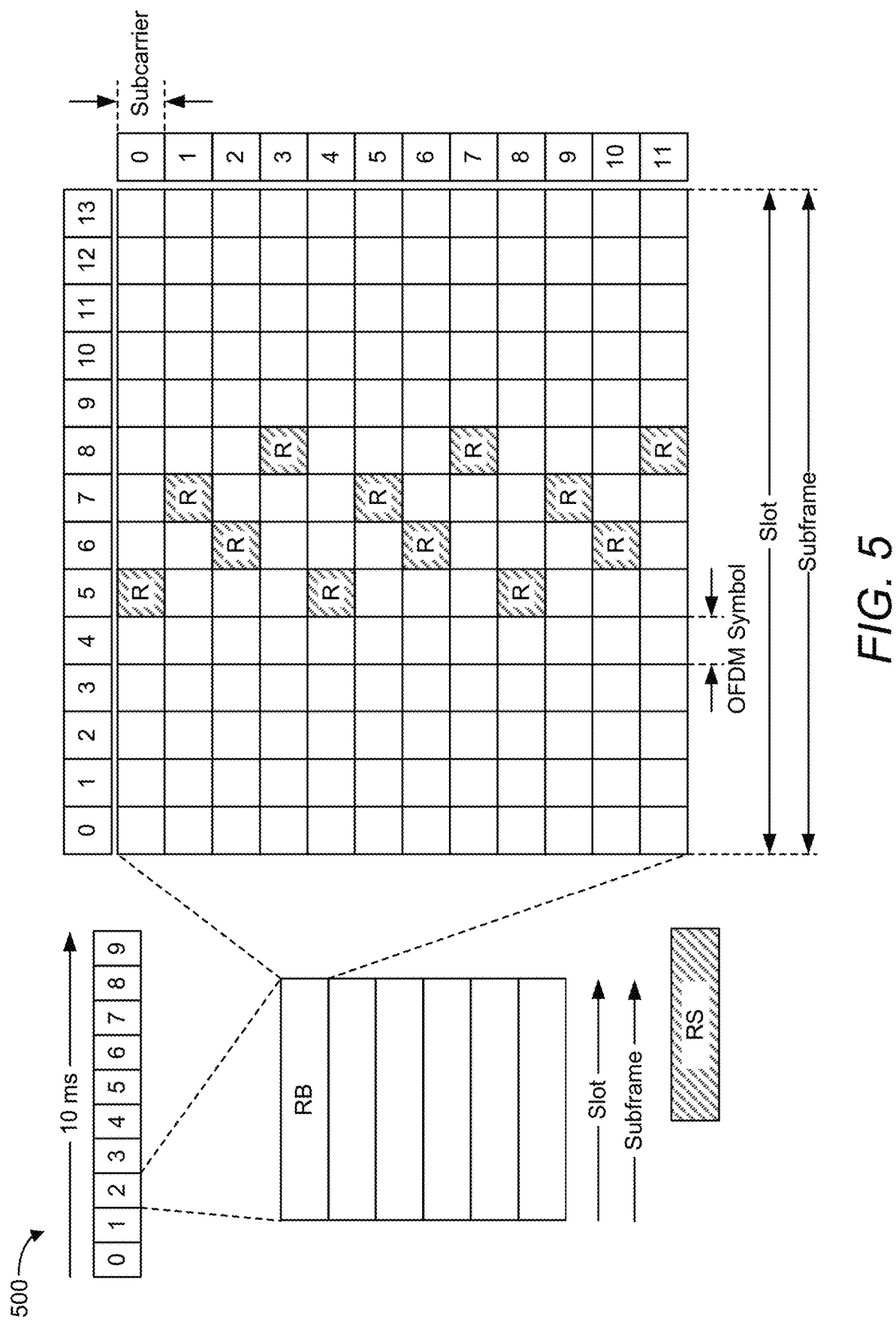
FIG. 5 is a diagram illustrating an example frame structure, according to aspects of the disclosure.

Various frame structures may be used to support downlink and uplink transmissions between network nodes (e.g., base stations and UEs). FIG. 5 is a diagram 500 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 KHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10, or 20 MHZ, respectively.

LTE supports a single numerology (subcarrier spacing (SCS), symbol length, etc.). In contrast. NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 KHZ SCS ($\mu$=0)), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 KHz SCS ($\mu=1$), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 µs, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 µs, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIG. 5, a numerology of 15 kHz is used. Thus, in the time domain, a 10 ms frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 5 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 5); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 6:
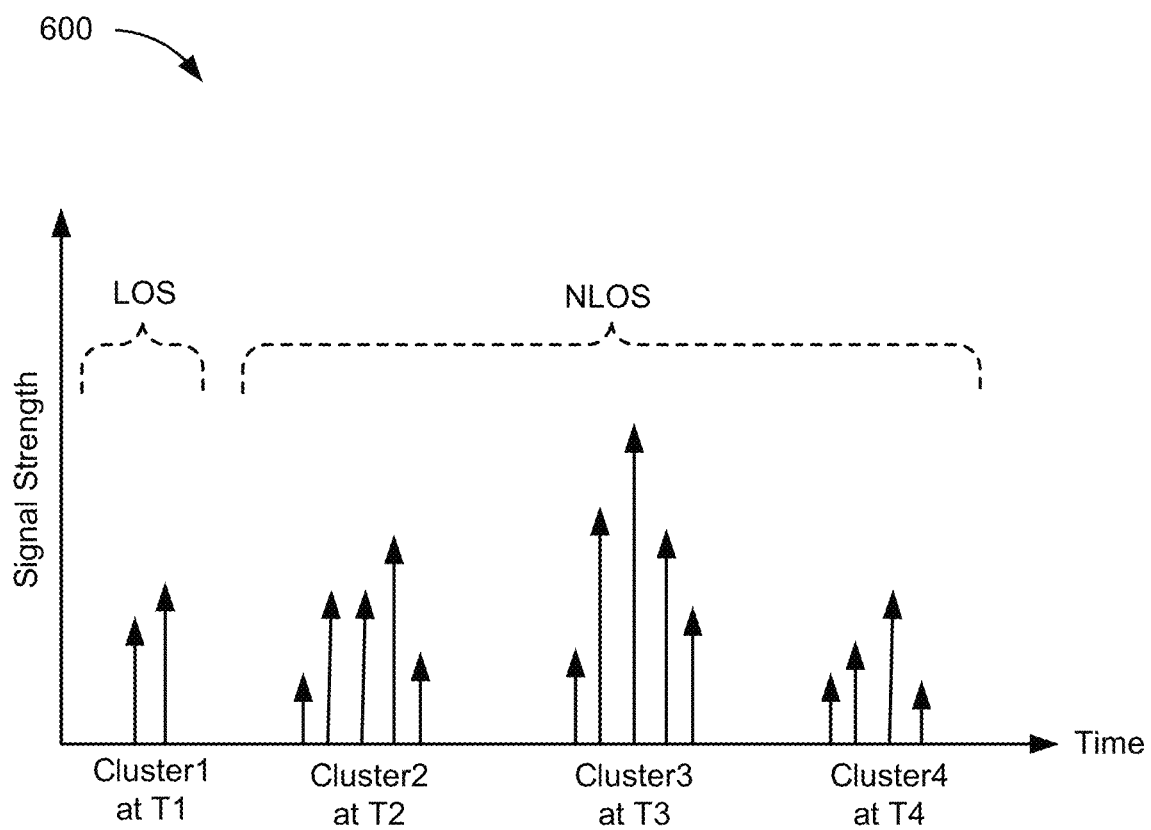
FIG. 6 is a graph representing a radio frequency (RF) channel estimate, according to aspects of the disclosure.

FIG. 6 is a graph 600 representing the channel estimate of a multipath channel between a receiver device (e.g., any of the UEs or base stations described herein) and a transmitter device (e.g., any other of the UEs or base stations described herein), according to aspects of the disclosure. The channel estimate represents the intensity of a radio frequency (RF) signal (e.g., a PRS) received through a multipath channel as a function of time delay, and may be referred to as the channel energy response (CER), channel impulse response (CIR), or power delay profile (PDP) of the channel. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 6, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 6, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6, because the first cluster of RF signals at time T1 arrives first, it is assumed to correspond to the RF signal transmitted on the transmit beam aligned with the line-of-sight (LOS), or the shortest, path. The third cluster at time T3 is comprised of the strongest RF signals, and may correspond to, for example, the RF signal transmitted on a transmit beam aligned with a non-line-of-sight (NLOS) path. Note that although FIG. 6 illustrates clusters of two to five channel taps, as will be appreciated, the clusters may have more or fewer than the illustrated number of channel taps.

Machine learning may be used to generate models that may be used to facilitate various aspects associated with processing of data. One specific application of machine learning relates to generation of measurement models for processing of reference signals for positioning (e.g., PRS), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 7:
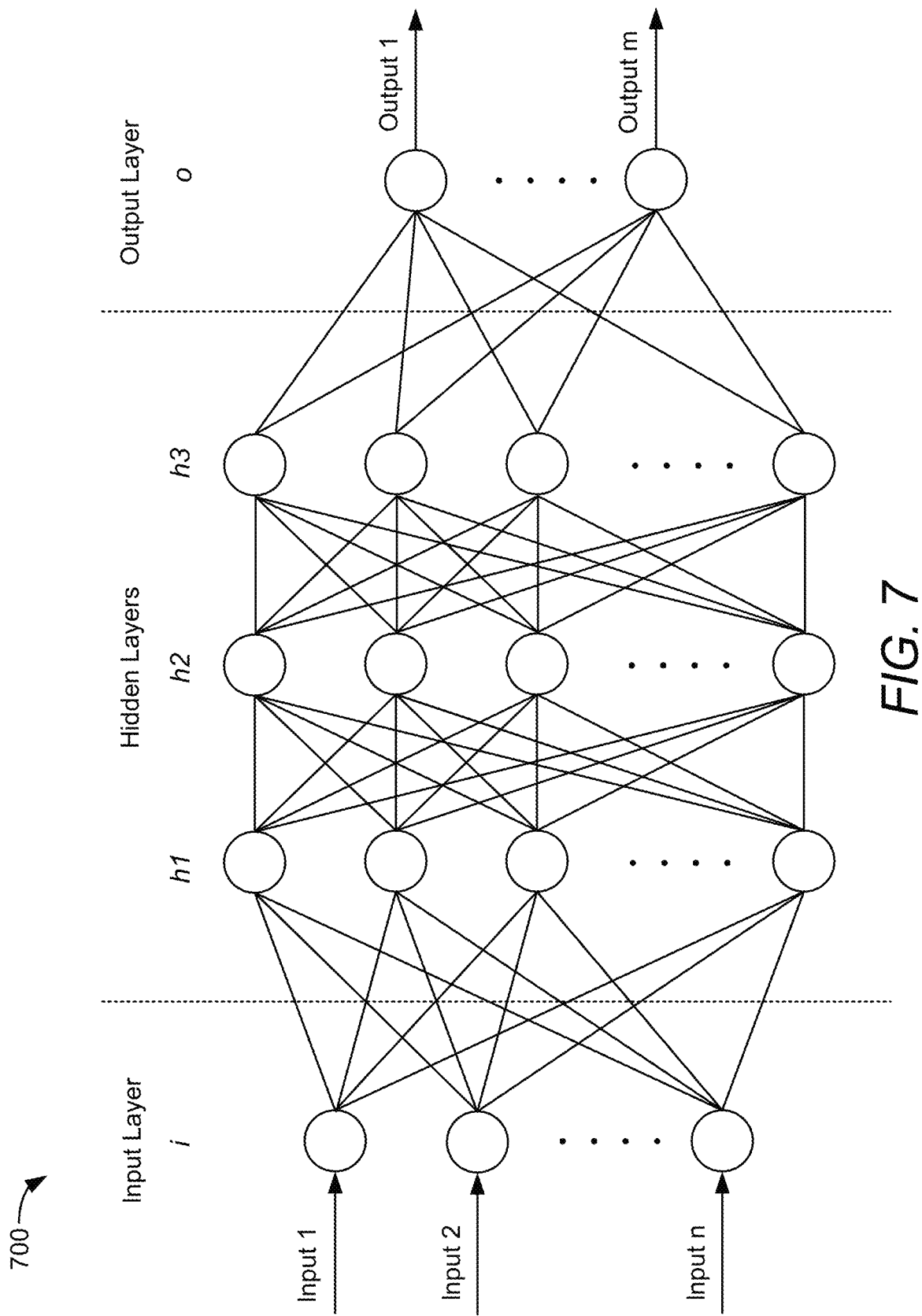
FIG. 7 illustrates an example neural network, according to aspects of the disclosure.

FIG. 7 illustrates an example neural network 700, according to aspects of the disclosure. The neural network 700 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system, such as processors 332, 384, or 394) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

NR supports RF fingerprint (RFFP)-based positioning, a type of positioning and localization technique that utilizes RFFPs captured by mobile devices to determine the locations of the mobile devices. An RFFP may be a histogram of a received signal strength indicator (RSSI), a CER, a CIR, a PDP, or a channel frequency response (CFR). An RFFP may represent a single channel received from a transmitter (e.g., a PRS), all channels received from a particular transmitter, or all channels detectable at the receiver. The RFFP(s) measured by a mobile device (e.g., a UE) and the locations of the transmitter(s) associated with the measured RFFP(s) (i.e., the transmitters transmitting the RF signals measured by the mobile device to determine the RFFP(s)) can be used to determine (e.g., triangulate) the location of the mobile device.

Machine learning positioning techniques have been shown to provide superior positioning performance when compared to classical positioning schemes. In machine learning-RFFP-based positioning, a machine learning model (e.g., neural network 700) takes as input the RFFPs of downlink reference signals (e.g., PRS) and outputs the positioning measurement (e.g., ToA, RSTD) or mobile device location corresponding to the inputted RFFPs. The machine learning model (e.g., neural network 700) is trained using the "ground truth" (i.e., known) positioning measurements or mobile device locations as the reference (i.e., expected) output of a training set of RFFPs.

For example, a machine learning model may be trained to determine the RSTD measurement of a pair of TRPs from RFFPs of PRS transmitted by the TRPs. The reference output for training such a model would be the correct (i.e., ground truth) RSTD measurement for the location of the mobile device at the time the mobile device obtained the RFFP measurements of the PRS. The network (e.g., location server) can determine the RSTD that would be expected for the pair of TRPs based on the known location of the mobile device and the known locations of the involved (measured) TRPs. The known location of the mobile device may be determined from multiple reported RSTD measurements and/or any other measurements reported by the mobile device (e.g., GPS measurements).

Figure 8:
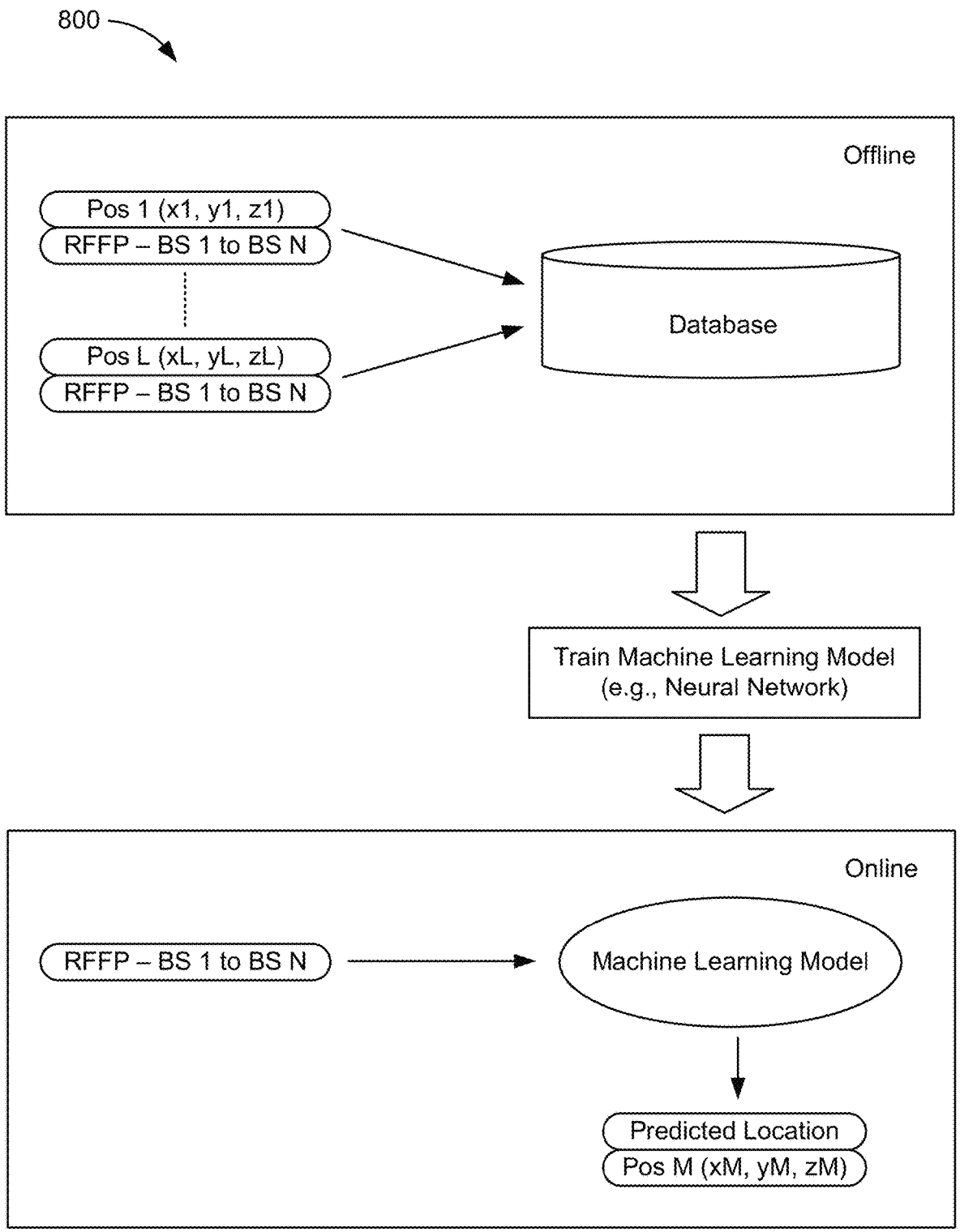
FIG. 8 is a diagram illustrating the use of a machine learning model for RF fingerprinting (RFFP)-based positioning, according to aspects of the disclosure.

FIG. 8 is a diagram 800 illustrating the use of a machine learning model for RFFP-based positioning, according to aspects of the disclosure. In the example of FIG. 8, during an "offline" stage, RFFPs (e.g., CERs/CIRs/CFRs) captured by a mobile device are stored in a database. The database may be located at the mobile device or a network entity (e.g., a location server), and each RFFP may include measurements of RF signals (or channels or links) transmitted by one or more transmitters, illustrated in FIG. 8 as base stations 1 to N (i.e., "BS 1" to "BS N"). For UE-based downlink RFFP (DL-RFFP) positioning, the network (e.g., the location server) configures the base stations to transmit downlink reference signals (e.g., PRS) to the mobile device, and the RFFPs are the CER(s)/CIR(s)/CFR(s) of the configured downlink reference signals detected by the mobile device.

Each measured RFFP is associated with the known location of the mobile device at the time the mobile device measured the RFFP, illustrated in FIG. 8 as positions 1 to L (i.e., "Pos 1" to "Pos L"). The mobile device's location may be known via another positioning technique, such as discussed above with reference to FIG. 4. Note that although FIG. 8 illustrates RFFP information for a single mobile device, as will be appreciated, RFFP information for multiple mobile devices can be collected and stored in the database.

Based on the information captured during the offline stage, a machine learning model (e.g., neural network 700) is trained to predict the location of a mobile device based on RFFPs measured by the mobile devices. More specifically, a training set of RFFP measurements is used as input to the machine learning model and the known locations of the mobile devices when capturing the RFFPs are used as labels. After training, during an "online" stage, the trained machine learning model can be used to predict (infer) the location of a mobile device (illustrated as "Pos M") based on the RFFP(s) currently measured by the mobile device. For UE-based RFFP positioning, the network (e.g., the location server) provides the trained machine learning model to the mobile device. For UE-assisted positioning, the mobile device may provide the RFFP measurements to the network for processing.

Note that although FIG. 8 illustrates using an RFFP-based machine learning model to estimate the location of a UE, the outputs (or extracted features) of the machine learning model may instead be positioning measurements based on the input RFFPs, such as RSTD measurements, ToA measurements, DL-AoD measurements, etc.

Figure 9:
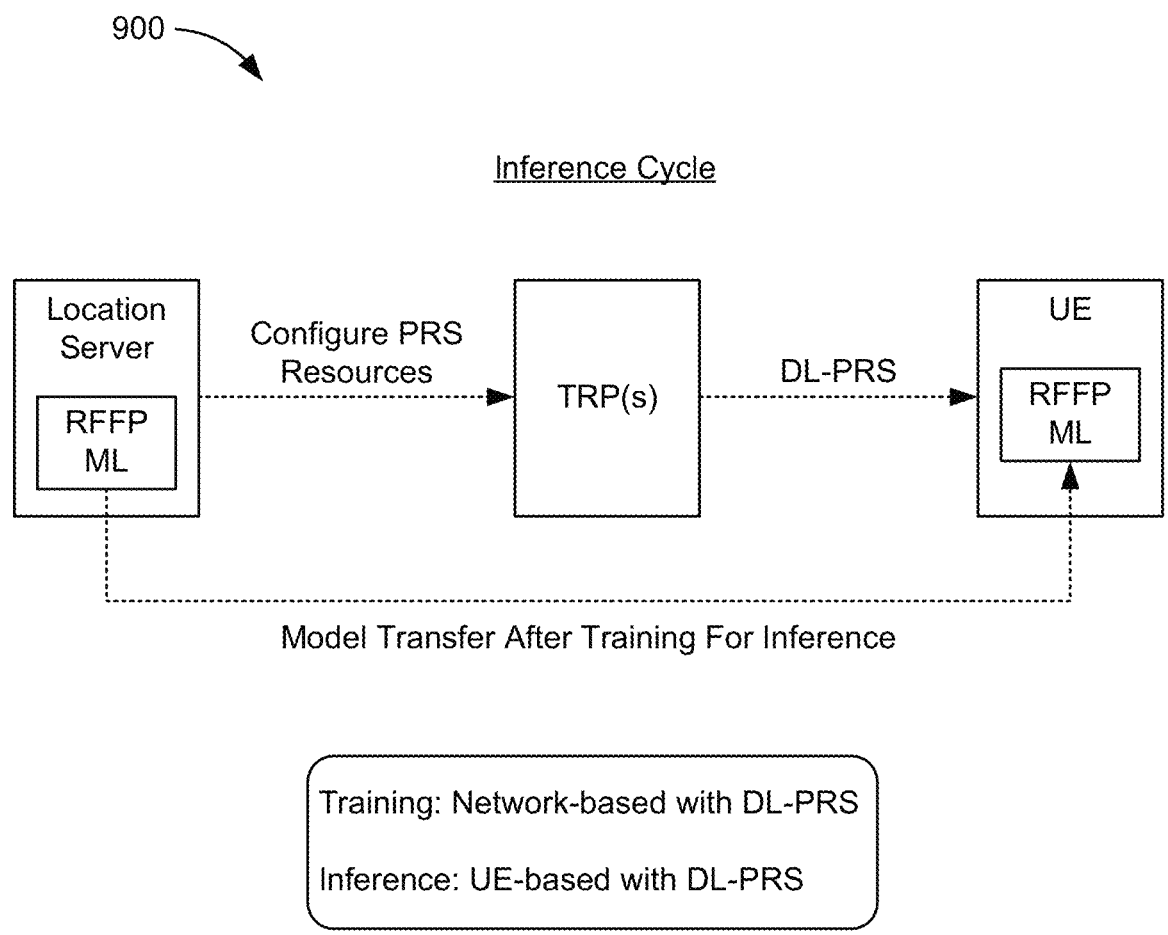
FIG. 9 is a diagram illustrating the inference cycle for UE-based downlink RFFP (DL-RFFP) positioning, according to aspects of the disclosure.

FIG. 9 is a diagram 900 illustrating the inference cycle for UE-based DL-RFFP positioning, according to aspects of the disclosure. As shown in FIG. 9, the location server (e.g., LMF 270)) configures DL-PRS resources to be transmitted by one or more TRPs during a positioning session with a UE. The TRP(s) then transmit the configured DL-PRS to the UE, which measures the RFFPs of the DL-PRS.

In the example of FIG. 9, the location server previously trained a machine learning model for RFFP positioning (labeled "RFFP ML"), as discussed above with reference to FIGS. 7 and 8. The location server provides the machine learning model to the UE to perform inferences (e.g., determining a positioning measurement based on the measured RFFPs) during the positioning session. As such, after measuring the RFFPs of the DL-PRS, the UE inputs the measured RFFPs to the received machine learning model to obtain the associated positioning measurement(s) (e.g., ToA, RSTD).

Figure 10:
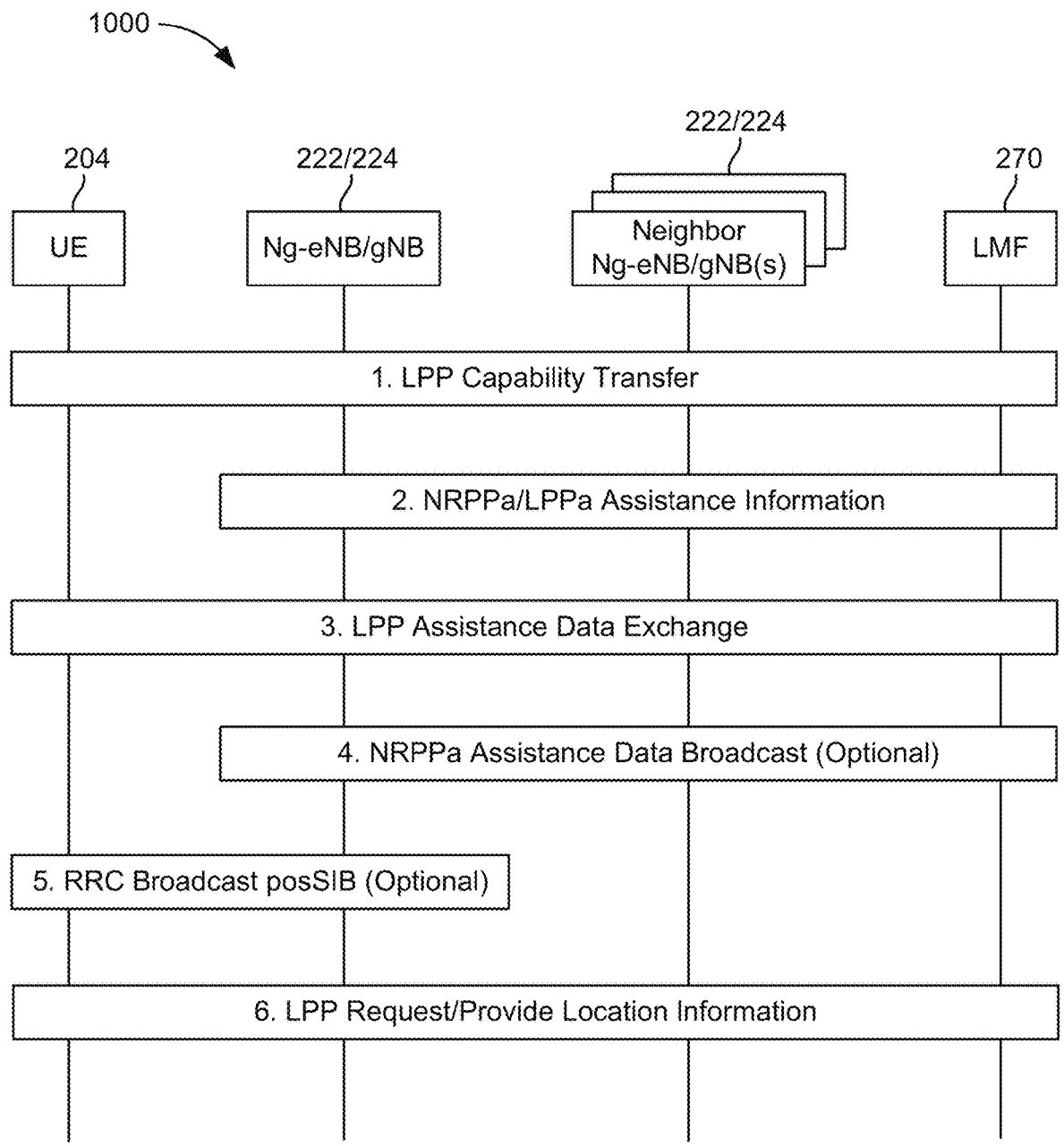
FIG. 10 illustrates an example call flow for UE-based DL-RFFP positioning, according to aspects of the disclosure.

FIG. 10 illustrates an example call flow 1000 for UE-based DL-RFFP positioning, according to aspects of the disclosure. At stage 1, the UE 204 and LMF 270 perform an LPP positioning capability transfer procedure during which the UE 204 provides its positioning capabilities to the LMF 270. At stage 2, the LMF 270 provides assistance information to the UE's 204 serving ng-eNB/gNB 222/224 and any neighboring ng-eNBs/gNBs 222/224, such as the PRS resource configuration of the DL-PRS to be transmitted to the UE 204. At stage 3, the UE 204 and LMF 270 perform an LPP assistance data exchange. During the exchange, the LMF 270) provides assistance data to the UE 204 for the positioning session, such as the configuration of the DL-PRS transmitted by the involved ng-eNBs/gNBs 222/224 and the machine learning model to use to report positioning measurements of the DL-PRS.

At stage 4, the LMF 270 optionally provides assistance information to the involved ng-eNBs/gNBs 222/224 via New Radio positioning protocol type A (NRPPa) messages. At stage 5, the serving ng-eNB/gNB 222/224 optionally broadcasts the assistance information received from the LMF 270 as assistance data in one or more positioning SIBs (posSIBs). At stage 6, the LMF 270 and the UE 204 perform an LPP request/provide location information procedure, during which the UE 204 provides positioning measurements taken of the DL-PRS transmitted by the ng-eNBs/gNBs 222/224. The positioning measurements may be derived by applying the machine learning model received in the assistance data to the RFFPs of the measured DL-PRS. The various stages illustrated in FIG. 10 will be discussed in greater detail below.

Currently, LPP and NRPPa do not support RFFP positioning procedures. Accordingly, the present disclosure provides LPP and NRPPa signaling and procedures to enable UE-based DL-RFFP positioning.

Figure 11:
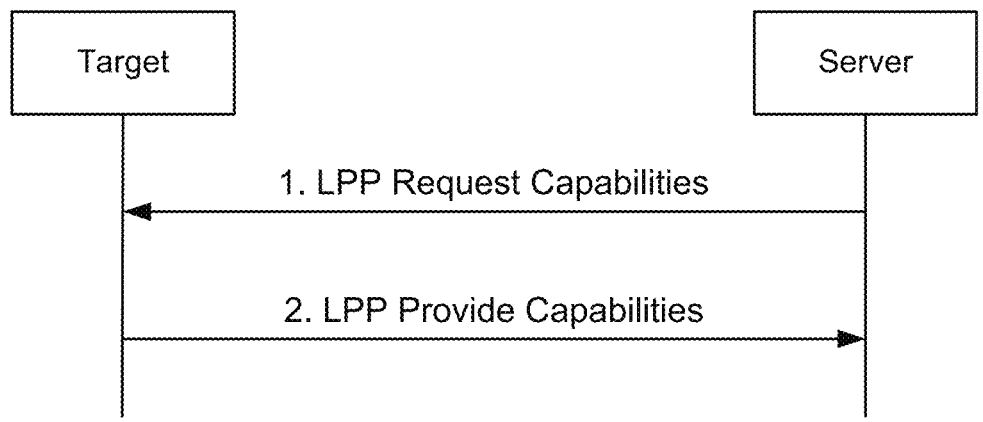
FIG. 11 illustrates the two procedures for exchanging UE positioning capabilities with the network currently supported by Long-Term Evolution (LTE) positioning protocol (LPP).
Figure 11:
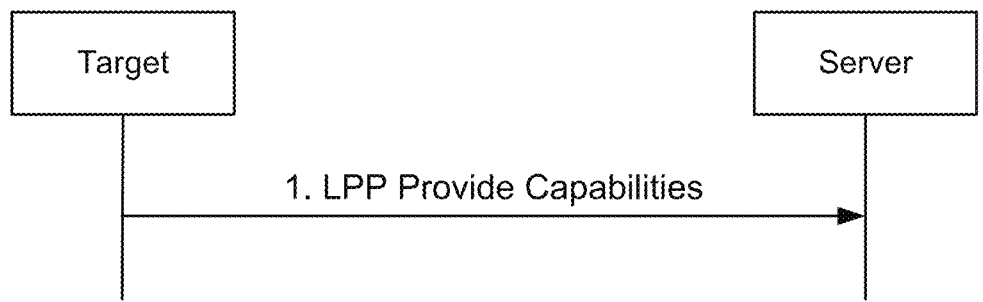

Referring to the LPP positioning capability transfer at stage 1 of FIG. 10 in greater detail, FIG. 11 illustrates the two procedures for exchanging UE positioning capabilities with the network currently supported by LPP. The first is a capability transfer procedure and the second is a capability indication procedure. Diagram 1100 illustrates the capability transfer procedure, in which the location server (e.g., LMF 270) indicates the types of capabilities needed from the UE 204 (e.g., in an LPP RequestCapabilities" information element (IE)). Diagram 1150 illustrates the capability indication procedure, in which the target (e.g., UE 204) provides unsolicited capabilities to the server (e.g., in an LPP "ProvideCapabilities" IE).

Currently, LPP does not support the request or indication of UE-based DL-RFFP capabilities. Accordingly, the present disclosure provides signaling to enable the location server to request, and the UE to provide, UE capabilities for UE-based DL-RFFP positioning. Specifically, the location server can request a target UE to provide capabilities related to UE-based DL-RFFP positioning as part of the LPP positioning capability transfer procedure at stage 1 of FIG. 10. For example, the request may be an "nr-DL-RFFP-RequestCapabilities" parameter (e.g., IE) in the LPP "RequestCapabilities" IE, similar to an LPP "otdoa-RequestCapabilities" IE, an LPP "ecid-RequestCapabilities" IE, an LPP "nr-Multi-RTT-RequestCapabilities" IE, etc.

Such a request can first inquire a target UE for its general capability description (e.g., whether the UE can support UE-based DL-RFFP positioning). The request can include a flag to notify the target UE whether it should provide a detailed capability response or wait for specific requests. Further specific requests can solicit certain capabilities based on the UE's response.

The target UE may provide its UE-based DL-RFFP positioning capabilities to the location server as part of an LPP capability transfer procedure (illustrated by diagram 1100 of FIG. 11) or an LPP capability indication procedure (illustrated by diagram 1150 of FIG. 11). For an LPP capability indication procedure, the target UE can indicate an initial set of its UE-based DL-RFFP positioning capabilities and then wait for solicited capability requests from the location server. The UE may report its RFFP positioning capabilities in an "nr-DL-RFFP-ProvideCapabilities" parameter (e.g., IE) in the LPP "ProvideCapabilities" IE, similar to an "otdoa-ProvideCapabilities" IE, an LPP "nr-DL-AoD-ProvideCapabilities" IE, etc.

As another option, some of the UE-based DL-RFFP positioning capabilities can be exchanged as part of an LPP capability transfer procedure or an LPP capability indication procedure, and the remaining RFFP positioning capabilities may be provided through other artificial intelligence (AI) or machine learning network entities (e.g., 3GPP or non-3GPP). The location server would then need to coordinate with the other network entities to retrieve these remaining capabilities.

The capability message from the target UE may include a flag indicating the target UE's capability to conduct DL-RFFP positioning using a network-provided machine learning model. For example, a value of "0" may indicate that UE-based DL-RFFP positioning is not supported, and a value of "1" may indicate that UE-based DL-RFFP positioning is supported.

If UE-based DL-RFFP positioning is supported, then the capability message may include a flag indicating how the location server should retrieve the target UE's capability for handling the machine learning model for positioning. For example, a value of "0" may indicate that the machine learning model capability parameters will be sent as part of an LPP "ProvideCapabilities" message. A value of "1" may indicate that the machine learning model capability parameters will be sent via another AI or machine learning network entity. The location server would then need to coordinate with the other network entity to retrieve these remaining capabilities. The flag may be associated with each capability parameter or with groups of capability parameters.

The capability message may include the maximum number of concurrent machine learning instances (i.e., concurrent instances of a machine learning model, which may be activated for concurrent positioning sessions) the target UE can handle. The capability message may also include resource capabilities (e.g., the LPP IE "NR-DL-PRS-ResourcesCapability") and resource processing capabilities (e.g., the LPP IE "NR-DL-PRS-ProcessingCapability") that are related to UE-based DL-RFFP positioning. These capabilities may include, for example, the maximum number of frequency layers, the frequency band indicator, the bandwidth, the PRS buffer capability, and/or the like.

The capability message may further include a list of supported machine learning model formats (e.g., Open Neural Network Exchange (ONNX), etc.). The capability message may also include the maximum machine learning model size (e.g., the maximum number of parameters). The capability message may also include parameters related to inference, such as a list of supported features (e.g., CFR, CIR, Doppler statistics, delay spread statistics, and/or the like), the maximum IFFT size, the maximum number of antenna pairs the target UE can process (which would be a buffering capability), the maximum channel estimate (e.g., CIR, CFR) window (which would be a buffering capability), and/or the like. The purpose of these parameters is that the machine learning model will be provided by the location server, and therefore, the location server needs to know what machine learning model(s) the target UE can support.

Figure 12:
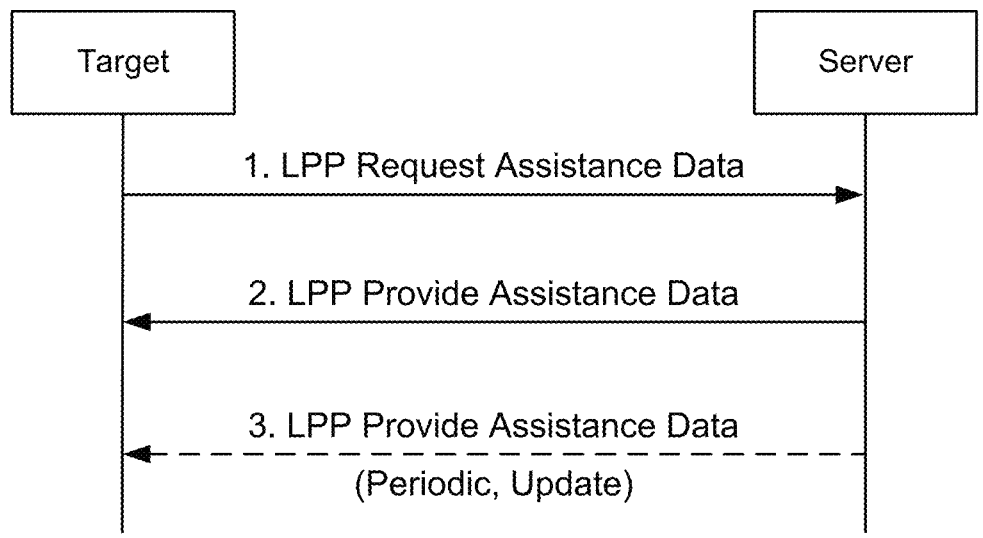
FIG. 12 illustrates the two procedures for exchanging positioning assistance data currently supported by LPP.
Figure 12:
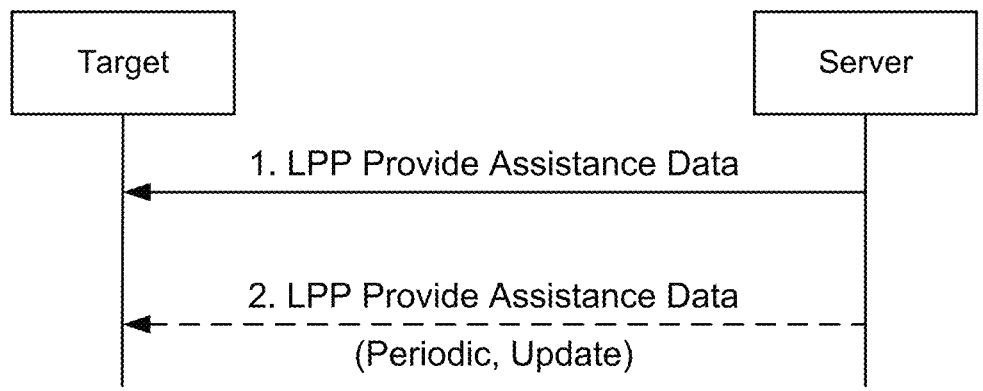

Referring to the LPP assistance data exchange at stage 3 of FIG. 10 in greater detail, FIG. 12 illustrates the two procedures for exchanging positioning assistance data currently supported by LPP. The first is an assistance data transfer procedure and the second is an assistance data delivery procedure. Diagram 1200 illustrates the assistance data transfer procedure, in which the location server (e.g., LMF 270) provides the assistance data necessary for positioning (e.g., in an LPP "ProvideAssistanceData" IE) in response to a request for assistance data (e.g., an LPP "RequestAssistanceData" IE) from the target UE. The assistance data may be provided on-demand, periodically, or periodically with updates. Diagram 1250) illustrates the assistance data delivery procedure, in which the location server provides unsolicited assistance data necessary for positioning. The assistance data may be provided periodically or non-periodically.

Currently, LPP does not support the request or delivery of UE-based DL-RFFP positioning assistance data. Accordingly, the present disclosure provides signaling to enable the target UE to request, and the location server to provide, positioning assistance data for UE-based DL-RFFP positioning. Specifically, the target UE can request the location server to provide assistance data related to UE-based DL-RFFP positioning as part of the LPP assistance data transfer procedure (illustrated by diagram 1200 of FIG. 12). For example, the request may be an "nr-DL-RFFP-RequestAssistanceData" parameter (e.g., IE) in the LPP "RequestAssistanceData" IE.

The location server may then provide assistance data related to UE-based DL-RFFP positioning as part of an LPP assistance data transfer procedure (illustrated by diagram 1200 of FIG. 12) or an LPP assistance data delivery procedure (illustrated by diagram 1250 of FIG. 12). For example, the assistance data may be provided in an "nr-DL-RFFP-ProvideAssistanceData" parameter (e.g., IE) in the LPP "ProvideAssistanceData" IE.

The assistance data message may include a flag that indicates whether the target UE should expect machine learning model details as part of an LPP assistance data message or whether the target UE should retrieve the machine learning model through another AI or machine learning network entity (e.g., 3GPP or non-3GPP). For example, a value of "0" may indicate that the assistance data will not include a description of the machine learning model, while a value of "1" may indicate that the assistance data will include a description of the machine learning model.

The assistance data message may provide information related to the machine learning model description, such as the machine learning model identifier (ID), machine learning model details (such as the format (e.g., ONNX), the machine learning model structure and parameters (i.e., weights)), the input feature type (e.g., CFR, CIR, etc.), and/or the like. The assistance data message may also provide information related to the mapping of measurements to machine learning model inputs (e.g., a bitmap of measurements to machine learning model inputs).

The assistance data message may further include a flag indicating whether the target UE should perform measurement preprocessing before positioning. For example, a value of "0" may indicate that no measurement preprocessing is required (meaning that any measurement preprocessing is part of the machine learning model design). A value of "1" may indicate that measurement preprocessing is required (meaning that measurement preprocessing steps are explicitly provided).

If the target UE is expected to perform preprocessing, the assistance data message may also provide information related on how the target UE should preprocess measurements before passing them to the machine learning model. Measurement preprocessing operations include (1) calibration, (2) IFFT, (3) cyclic sample shifting, (4) windowing, and (5) scaling. The assistance data may indicate the sequence of performing these operations. The measurement preprocessing parameters may include the calibration values, the IFFT size, the cyclic sample shifting values, window parameters (weights, length, and center location), and/or scaling options (e.g., per-antenna, per-TRP, all).

The assistance data may also include information related to the resources to be used for the UE-based DL-RFFP positioning. For example, the assistance data may indicate the physical cell IDs (PCIs), global cell IDs (GCIs), ARFCN, and PRS IDs of candidate TRPs for measurement, the DL-PRS configuration of the candidate TRPs, SSB information of the TRPs (e.g., the time/frequency occupancy of the SSBs), the spatial direction information (e.g., azimuth, elevation, etc.) of the DL-PRS resources of the TRPs, geographical coordinates of the TRPs (include a transmission reference location for each DL-PRS resource ID, reference location for the transmitting antenna of the reference TRP, relative locations for transmitting antennas of other TRPs), PRS-only transmission point indication, and/or the like.

Figure 13:
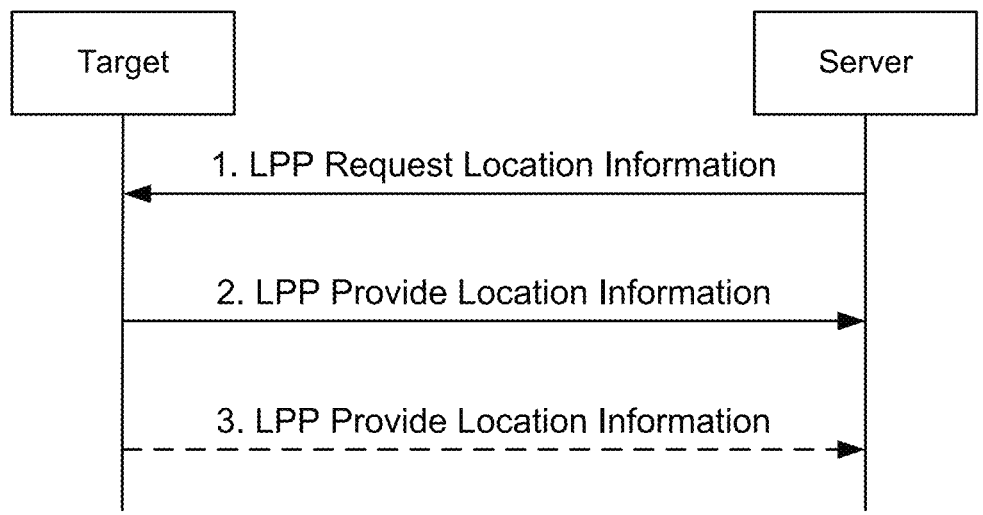
FIG. 13 illustrates the two procedures for exchanging location information currently supported by LPP.
Figure 13:
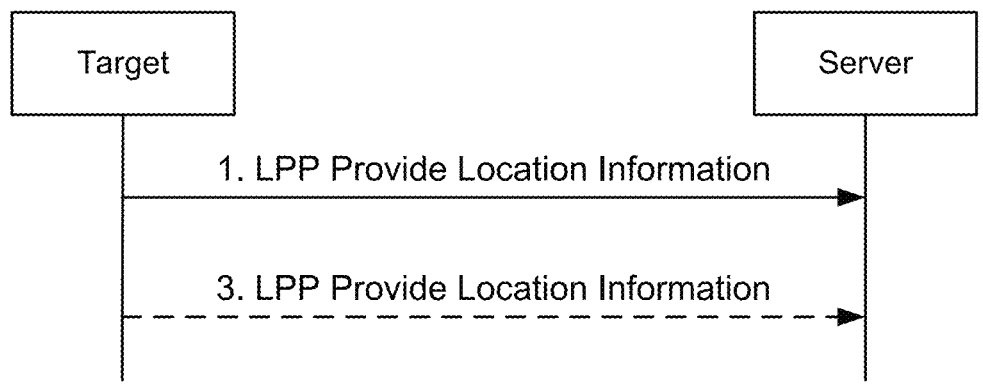

Referring to the LPP location information exchange at stage 6 of FIG. 10 in greater detail, FIG. 13 illustrates the two procedures for exchanging location information currently supported by LPP. The first is a location information transfer procedure and the second is a location information delivery procedure. Diagram 1300 illustrates the location information transfer procedure and diagram 1350 illustrates the location information delivery procedure. A location information transfer procedure (diagram 1300) is used to support the transfer of positioning estimations based on a requested service. The location server may transmit an LPP "RequestLocationInformation" IE indicating the type of location information needed and the associated QoS. A location information delivery procedure (diagram 1350) supports the delivery of positioning estimations based on unsolicited service. In both the location information transfer procedure and the location information delivery procedure, the target UE transmits an LPP "ProvideLocationInformation" IE that includes the requested or unsolicited information.

Currently, LPP does not support the request or delivery of location information related to a UE-based DL-RFFP procedure. Accordingly, the present disclosure provides signaling to enable the location server to request, and the target UE to provide, location information for UE-based DL-RFFP positioning. Specifically, the location server can request a target UE to provide location information related to UE-based DL-RFFP positioning as part of the LPP location information transfer procedure at stage 6 of FIG. 10. For example, the request may be an "nr-DL-RFFP-RequestLocationInformation" parameter (e.g., IE) in the LPP "RequestLocationInformation" IE.

The location information request message may include report configurations indicating the periodicity of reporting the estimated positions of the target UE. The request message may also include the type of position requested (e.g., absolute, relative, TDOA estimates, ToA estimates, etc.). The request message may also include a coarse estimate of the target UE's location to enable the UE to utilize the coarse location estimate to enhance positioning.

The location information request message may optionally include updates regarding the downlink resources (e.g., DL-PRS resources) that can be used for positioning. The request message may also optionally include updates to the measurement preprocessing operations to be applied by the target UE (e.g., calibration, IFFT, windowing, etc.). The request message may also optionally include updates to the machine learning model to be used for positioning (e.g., an updated model ID, a request for the target UE to download an updated machine learning model from another network-side model repository). The request message may further optionally include a flag to trigger the target UE to report the downlink resources that have been used for positioning.

In response to the location information request, the target UE conducts UE-based DL-RFFP positioning as requested and provides location information as part of a provide location information message. For example, the UE may provide the requested location information in an "nr-DL-RFFP-ProvideLocationInformation" parameter (e.g., IE) as part of the location information transfer or delivery procedures illustrated in FIG. 13. The "nr-DL-RFFP-ProvideLocationInformation" parameter/IE may be included in an LPP "ProvideLocationInformation" IE.

The provide location information message may include the estimated location of the target UE, and/or the estimated ToA or RSTD if the machine learning model is used to estimate those measurements. The provide location information message may also include a metric for indicating the quality/reliability of the estimated target location. The provide location information message may also include the time needed to run the machine learning model and obtain the inference of the target UE's location. The provide location information message may also include timestamps of the reported measurements. The provide location information message may also include measurements of the downlink resources (e.g., DL-PRS) used in the RFFP positioning (e.g., RSRP). The provide location information may also include the IDs of the resources used in the RFFP positioning.

The provide location information message may further include customized additional measurement elements. These may be customized by the UE vendor, the network operator, the machine learning model vendor, and/or the like.

Referring now to the optional broadcast of assistance information at stages 4 and 5 of FIG. 10, the broadcast of positioning assistance data is currently supported via the broadcast of posSIBs. The posSIBs are carried in RRC system information (SI) messages. For NR RRC SI, a single "SIBpos" IE is defined, which is carried in the IE "PosSystemInformation." There is a mapping of positioning SIB type (in the IE "posSibType") to assistance data elements carried in a posSIB. For example, posSibType1-1 to posSibType1-8 provide common assistance data for global navigation satellite system (GNSS) positioning, posSibType3-1 provides assistance data for OTDOA positioning, and posSibType6-1 to posSibType6-3 provide assistance data for DL-TDOA/DL-AOD positioning.

Figure 14:
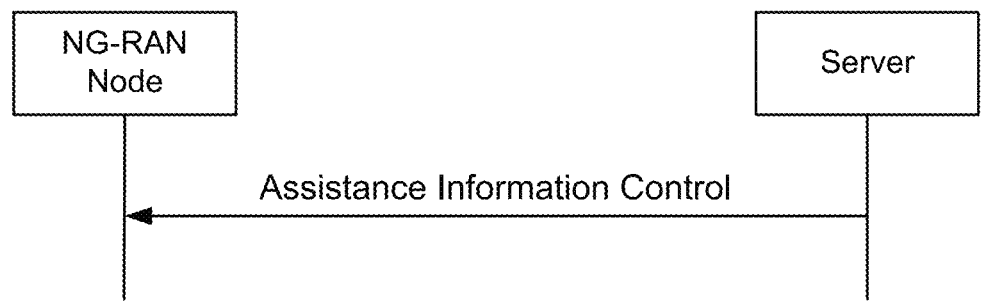
FIG. 14 is a diagram illustrating an assistance information control procedure between a location server and an Next Generation radio access network (NG-RAN) node.

The location server (e.g., LMF 270) may signal positioning assistance information to an NG-RAN node for assistance data broadcasting in posSIBs. FIG. 14 is a diagram 1400 illustrating an assistance information control procedure between a location server (e.g., LMF 270) and an NG-RAN node (e.g., a gNB). The assistance information control procedure applies if the NG-RAN node is a gNB, and may be performed at stage 4 of FIG. 10. As noted with reference to FIG. 10, the signaling between the location server and the NG-RAN node is via NRPPa. The purpose of the assistance information control procedure is to allow the location server to signal positioning assistance information to the NG-RAN node for assistance data broadcasting. That is, the location server sends the content of the posSIB(s) to be broadcasted via RRC. The location server may send the assistance information in response to a UE request for such assistance data, referred to as "on-demand assistance data," or simply as cell-wide assistance data to be broadcast by the NG-RAN node.

Currently there is no support for broadcasting assistance information that relates to UE-based DL-RFFP positioning. Accordingly, the present disclosure provides signaling to support the broadcast of assistance data for UE-based DL-RFFP positioning. The location server may provide assistance information related to UE-based DL-RFFP positioning as part of the assistance information control procedure illustrated in FIG. 14. The assistance information may then be broadcasted in one or more RRC posSIBs.

Like the currently defined posSIBs, there may be a mapping of positioning SIB type (in the IE "posSibType") to assistance data elements carried in the posSIB. Table 1 below illustrates an example mapping:

TABLE 1

| | posSibType | Assistance Data Element |
|---|---|---|
| NR DL-RFFP Assistance Data | posSIBType7-1 | NR-DL-PRS-AssistanceData |
| | posSIBType7-2 | NR-DL-RFFP-AssistanceData |

A broadcasted posSIB may include a flag indicating whether the target UE should expect machine learning model details as part of the LPP assistance data message (at stage 3 of FIG. 10 and as shown in FIG. 13) or whether the target UE should retrieve the model through another AI or machine learning model network entity. For example, a value of "0" may indicate that the posSIB assistance data broadcast does not include a description of the machine learning model, while a value of "1" may indicate that the posSIB assistance data broadcast does include a description of the machine learning model.

A posSIB message for DL-RFFP positioning may provide information related to the machine learning model description, such as the machine learning model ID, machine learning model details (such as the format (e.g., ONNX), the machine learning model structure and parameters (i.e., weights)), the input feature type (e.g., CFR, CIR, etc.), and/or the like. The posSIB message may also provide information related to the mapping of measurements to machine learning model inputs (e.g., a bitmap of measurements to machine learning model inputs).

A posSIB message for DL-RFFP positioning may include a flag indicating whether a target UE should perform measurement preprocessing before positioning. For example, a value of "0" may indicate that no measurement preprocessing is required (i.e., measurement preprocessing is part of the machine learning model design), while a value of "1" may indicate that measurement preprocessing is required (and the measurement preprocessing steps are provided explicitly).

Where the flag indicates that preprocessing is required, the posSIB message may provide assistance data related on how the target UE should preprocess measurements before passing them to the machine learning model. As noted above, measurement preprocessing operations include (1) calibration, (2) IFFT, (3) cyclic sample shifting, (4) windowing, and (5) scaling. The assistance data may indicate the sequence of performing these operations. The measurement preprocessing parameters may include the calibration values, the IFFT size, the cyclic sample shifting values, window parameters (weights, length, and center location), and/or scaling options (e.g., per-antenna, per-TRP, all).

A posSIB message for DL-RFFP positioning may also provide assistance data related to the resources (e.g., DL-PRS resources) to be used for positioning. For example, as shown in Table 1, posSIBType7-1 may provide assistance data for the DL-PRS resources to measure.

Figure 15:
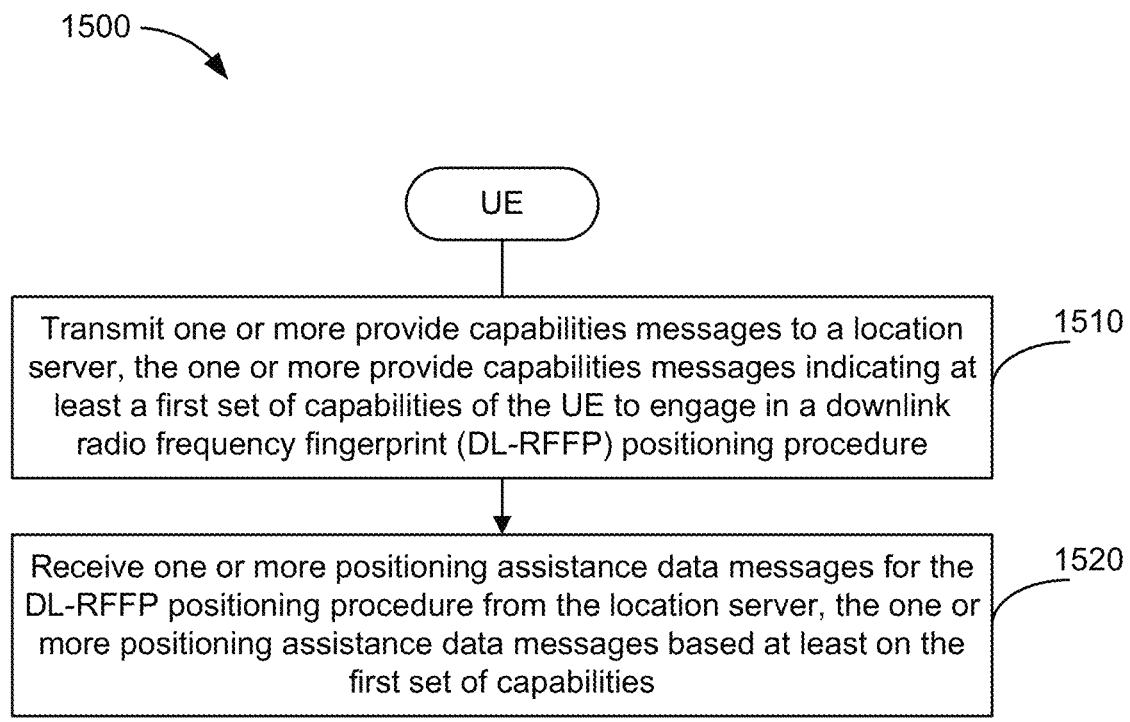
FIGS. 15 to 17 illustrate example methods of wireless communication, according to aspects of the disclosure.

FIG. 15 illustrates an example method 1500 of wireless communication, according to aspects of the disclosure. In an aspect, method 1500 may be performed by a UE (e.g., any of the UEs described herein).

At 1510, the UE transmits one or more provide capabilities messages to a location server, the one or more provide capabilities messages indicating at least a first set of capabilities of the UE to engage in a DL-RFFP positioning procedure. In an aspect, operation 1510 may be performed by the one or more WWAN transceivers 310, the one or more processors 332, memory 340, and/or positioning component 342, any or all of which may be considered means for performing this operation.

At 1520, the UE receives one or more positioning assistance data messages for the DL-RFFP positioning procedure from the location server, the one or more positioning assistance data messages based at least on the first set of capabilities. In an aspect, operation 1520 may be performed by the one or more WWAN transceivers 310, the one or more processors 332, memory 340, and/or positioning component 342, any or all of which may be considered means for performing this operation.

As will be appreciated, a technical advantage of the method 1500 is enabling the UE to provide positioning capabilities, and receive assistance data, specific to DL-RFFP positioning.

Figure 16:
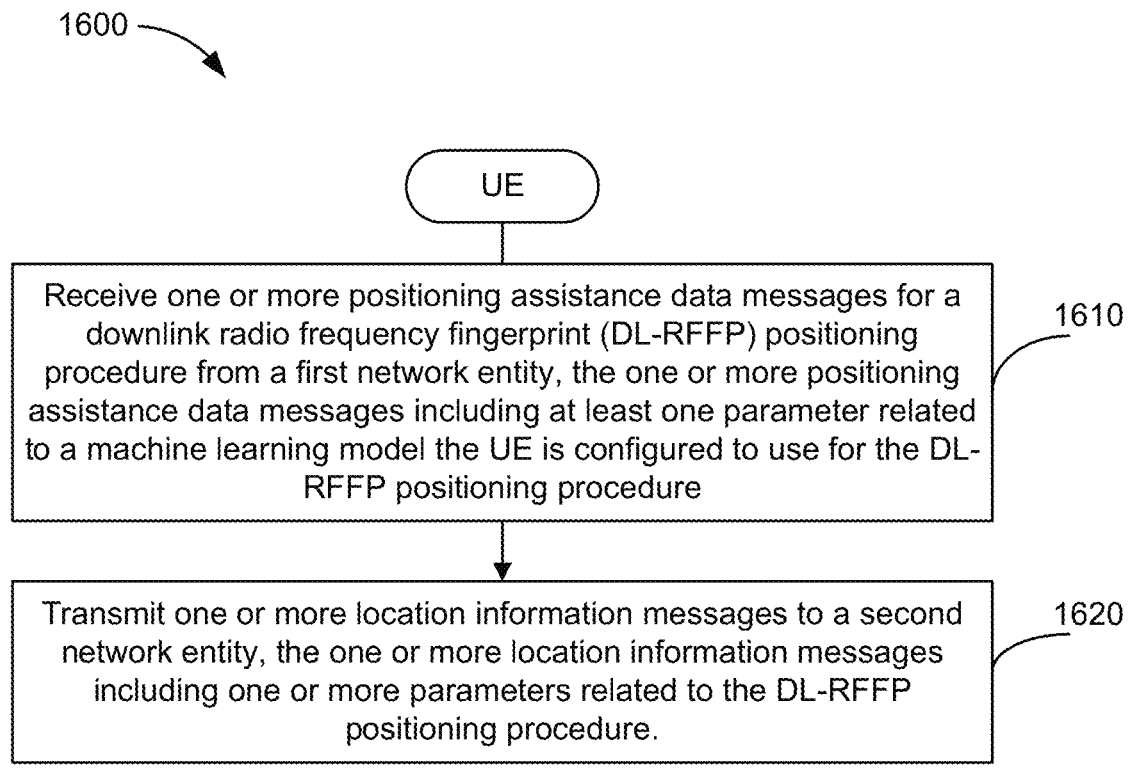

FIG. 16 illustrates an example method 1600 of wireless communication, according to aspects of the disclosure. In an aspect, method 1600 may be performed by a UE (e.g., any of the UEs described herein).

At 1610, the UE receives one or more positioning assistance data messages for a DL-RFFP positioning procedure from a first network entity, the one or more positioning assistance data messages including at least one parameter related to a machine learning model the UE is configured to use for the DL-RFFP positioning procedure. In an aspect, operation 1610 may be performed by the one or more WWAN transceivers 310, the one or more processors 332, memory 340, and/or positioning component 342, any or all of which may be considered means for performing this operation.

At 1620, the UE transmits one or more location information messages to a second network entity, the one or more location information messages including one or more parameters related to the DL-RFFP positioning procedure. In an aspect, operation 1620 may be performed by the one or more WWAN transceivers 310, the one or more processors 332, memory 340, and/or positioning component 342, any or all of which may be considered means for performing this operation.

As will be appreciated, a technical advantage of the method 1600 is providing the UE with assistance data specific to DL-RFFP positioning and enabling the UE to provide location information specific to DL-RFFP positioning.

Figure 17:
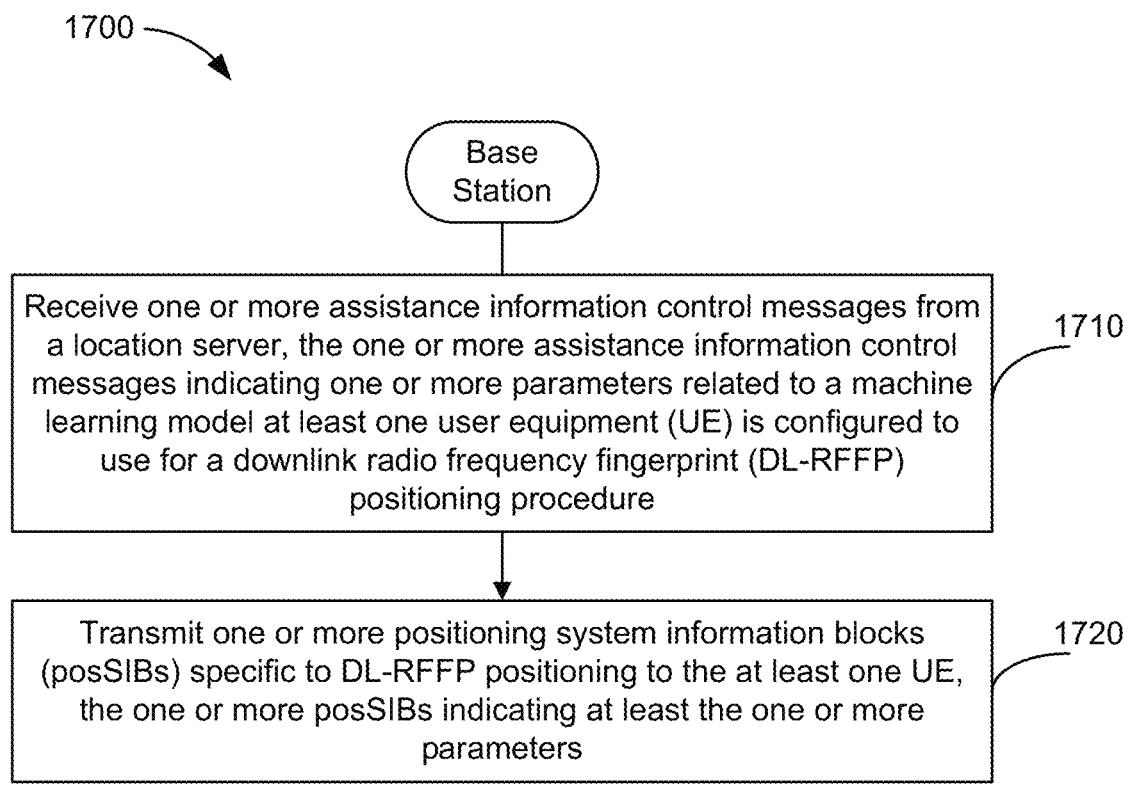

FIG. 17 illustrates an example method 1700 of wireless communication, according to aspects of the disclosure. In an aspect, method 1700 may be performed by a UE (e.g., any of the UEs described herein).

At 1710, the base station receives one or more assistance information control messages from a location server, the one or more assistance information control messages indicating one or more parameters related to a machine learning model at least one UE is configured to use for a DL-RFFP positioning procedure. In an aspect, operation 1710 may be performed by the one or more WWAN transceivers 350, the one or more network transceiver 380, the one or more processors 384, memory 386, and/or positioning component 388, any or all of which may be considered means for performing this operation.

At 1720, the base station transmits one or more posSIBs specific to DL-RFFP positioning to the at least one UE, the one or more posSIBs indicating at least the one or more parameters. In an aspect, operation 1720 may be performed by the one or more WWAN transceivers 350, the one or more processors 384, memory 386, and/or positioning component 388, any or all of which may be considered means for performing this operation.

As will be appreciated, a technical advantage of the method 1700 is providing the UE with assistance data specific to DL-RFFP positioning.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting one or more provide capabilities messages to a location server, the one or more provide capabilities messages indicating at least a first set of capabilities of the UE to engage in a downlink radio frequency fingerprint (DL-RFFP) positioning procedure; and receiving one or more positioning assistance data messages for the DL-RFFP positioning procedure from the location server, the one or more positioning assistance data messages based at least on the first set of capabilities.

Clause 2. The method of clause 1, wherein the first set of capabilities is an initial set of capabilities of the UE to engage in the DL-RFFP positioning procedure.

Clause 3. The method of any of clauses 1 to 2, further comprising: receiving a first request capabilities message from the location server, the first request capabilities message requesting at least the first set of capabilities of the UE.

Clause 4. The method of clause 3, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

Clause 5. The method of clause 4, further comprising: receiving a second request capabilities message from the location server, the second request capabilities message requesting a second set of capabilities of the UE based on the flag configuring the UE to wait for subsequent requests for specific capabilities of the UE related to the DL-RFFP positioning procedure.

Clause 6. The method of any of clauses 1 to 5, further comprising: transmitting a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

Clause 7. The method of clause 6, wherein: the first set of capabilities of the UE comprises a flag indicating that the UE supports DL-RFFP positioning, and the second set of capabilities of the UE comprises all capabilities of the UE related to the DL-RFFP positioning procedure.

Clause 8. The method of any of clauses 1 to 7, wherein the one or more provide capabilities messages includes a first flag indicating whether the UE is capable of using a network-provided machine learning model for the DL-RFFP positioning procedure.

Clause 9. The method of clause 8, wherein the one or more provide capabilities messages includes a second flag indicating how the location server can retrieve capabilities of the UE to use the network-provided machine learning model.

Clause 10. The method of clause 9, wherein: a first value of the second flag indicates that the capabilities of the UE to use the network-provided machine learning model are included in the one or more provide capabilities messages, and a second value of the second flag indicates that the capabilities of the UE to use the network-provided machine learning model are stored at a network entity other than the location server.

Clause 11. The method of any of clauses 8 to 10, wherein the first set of capabilities indicates: a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

Clause 12. The method of any of clauses 8 to 11, wherein the first set of capabilities indicates: a list of machine learning model formats supported by the UE, a maximum number of parameters for the network-provided machine learning model supported by the UE, one or more parameters related to inferences using the network-provided machine learning model, or any combination thereof.

Clause 13. The method of clause 12, wherein the one or more parameters related to inferences using the network-provided machine learning model indicate: a list of features supported by the UE, a maximum inverse fast Fourier transform (IFFT) size supported by the UE, a maximum number of antenna pairs the UE is capable of processing, a maximum channel estimate window size supported by the UE, or any combination thereof.

Clause 14. The method of any of clauses 8 to 13, further comprising: receiving the network-provided machine learning model from the location server or a network entity other than the location server.

Clause 15. A user equipment (UE), comprising: a memory: at least one transceiver; and at least one processor communicatively coupled to the memory and the at least one transceiver, the at least one processor configured to: transmit, via the at least one transceiver, one or more provide capabilities messages to a location server, the one or more provide capabilities messages indicating at least a first set of capabilities of the UE to engage in a downlink radio frequency fingerprint (DL-RFFP) positioning procedure; and receive, via the at least one transceiver, one or more positioning assistance data messages for the DL-RFFP positioning procedure from the location server, the one or more positioning assistance data messages based at least on the first set of capabilities.

Clause 16. The UE of clause 15, wherein the first set of capabilities is an initial set of capabilities of the UE to engage in the DL-RFFP positioning procedure.

Clause 17. The UE of any of clauses 15 to 16, wherein the at least one processor is further configured to: receive, via the at least one transceiver, a first request capabilities message from the location server, the first request capabilities message requesting at least the first set of capabilities of the UE.

Clause 18. The UE of clause 17, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

Clause 19. The UE of clause 18, wherein the at least one processor is further configured to: receive, via the at least one transceiver, a second request capabilities message from the location server, the second request capabilities message requesting a second set of capabilities of the UE based on the flag configuring the UE to wait for subsequent requests for specific capabilities of the UE related to the DL-RFFP positioning procedure.

Clause 20. The UE of any of clauses 15 to 19, wherein the at least one processor is further configured to: transmit, via the at least one transceiver, a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

Clause 21. The UE of clause 20, wherein: the first set of capabilities of the UE comprises a flag indicating that the UE supports DL-RFFP positioning, and the second set of capabilities of the UE comprises all capabilities of the UE related to the DL-RFFP positioning procedure.

Clause 22. The UE of any of clauses 15 to 21, wherein the one or more provide capabilities messages includes a first flag indicating whether the UE is capable of using a network-provided machine learning model for the DL-RFFP positioning procedure.

Clause 23. The UE of clause 22, wherein the one or more provide capabilities messages includes a second flag indicating how the location server can retrieve capabilities of the UE to use the network-provided machine learning model.

Clause 24. The UE of clause 23, wherein: a first value of the second flag indicates that the capabilities of the UE to use the network-provided machine learning model are included in the one or more provide capabilities messages, and a second value of the second flag indicates that the capabilities of the UE to use the network-provided machine learning model are stored at a network entity other than the location server.

Clause 25. The UE of any of clauses 22 to 24, wherein the first set of capabilities indicates: a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

Clause 26. The UE of any of clauses 22 to 25, wherein the first set of capabilities indicates: a list of machine learning model formats supported by the UE, a maximum number of parameters for the network-provided machine learning model supported by the UE, one or more parameters related to inferences using the network-provided machine learning model, or any combination thereof.

Clause 27. The UE of clause 26, wherein the one or more parameters related to inferences using the network-provided machine learning model indicate: a list of features supported by the UE, a maximum inverse fast Fourier transform (IFFT) size supported by the UE, a maximum number of antenna pairs the UE is capable of processing, a maximum channel estimate window size supported by the UE, or any combination thereof.

Clause 28. The UE of any of clauses 22 to 27, wherein the at least one processor is further configured to: receive, via the at least one transceiver, the network-provided machine learning model from the location server or a network entity other than the location server.

Clause 29. A user equipment (UE), comprising: means for transmitting one or more provide capabilities messages to a location server, the one or more provide capabilities messages indicating at least a first set of capabilities of the UE to engage in a downlink radio frequency fingerprint (DL-RFFP) positioning procedure; and means for receiving one or more positioning assistance data messages for the DL-RFFP positioning procedure from the location server, the one or more positioning assistance data messages based at least on the first set of capabilities.

Clause 30. The UE of clause 29, wherein the first set of capabilities is an initial set of capabilities of the UE to engage in the DL-RFFP positioning procedure.

Clause 31. The UE of any of clauses 29 to 30, further comprising: means for receiving a first request capabilities message from the location server, the first request capabilities message requesting at least the first set of capabilities of the UE.

Clause 32. The UE of any of clauses 32 to 31, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

Clause 33. The UE of any of clauses 33 to 32, further comprising: means for receiving a second request capabilities message from the location server, the second request capabilities message requesting a second set of capabilities of the UE based on the flag configuring the UE to wait for subsequent requests for specific capabilities of the UE related to the DL-RFFP positioning procedure.

Clause 34. The UE of any of clauses 29 to 33, further comprising: means for transmitting a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

Clause 35. The UE of clause 34, wherein: the first set of capabilities of the UE comprises a flag indicating that the UE supports DL-RFFP positioning, and the second set of capabilities of the UE comprises all capabilities of the UE related to the DL-RFFP positioning procedure.

Clause 36. The UE of any of clauses 29 to 35, wherein the one or more provide capabilities messages includes a first flag indicating whether the UE is capable of using a network-provided machine learning model for the DL-RFFP positioning procedure.

Clause 37. The UE of clause 36, wherein the one or more provide capabilities messages includes a second flag indicating how the location server can retrieve capabilities of the UE to use the network-provided machine learning model.

Clause 38. The UE of clause 37, wherein: a first value of the second flag indicates that the capabilities of the UE to use the network-provided machine learning model are included in the one or more provide capabilities messages, and a second value of the second flag indicates that the capabilities of the UE to use the network-provided machine learning model are stored at a network entity other than the location server.

Clause 39. The UE of any of clauses 36 to 38, wherein the first set of capabilities indicates: a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

Clause 40. The UE of any of clauses 36 to 39, wherein the first set of capabilities indicates: a list of machine learning model formats supported by the UE, a maximum number of parameters for the network-provided machine learning model supported by the UE, one or more parameters related to inferences using the network-provided machine learning model, or any combination thereof.

Clause 41. The UE of clause 40, wherein the one or more parameters related to inferences using the network-provided machine learning model indicate: a list of features supported by the UE, a maximum inverse fast Fourier transform (IFFT) size supported by the UE, a maximum number of antenna pairs the UE is capable of processing, a maximum channel estimate window size supported by the UE, or any combination thereof.

Clause 42. The UE of any of clauses 36 to 41, further comprising: means for receiving the network-provided machine learning model from the location server or a network entity other than the location server.

Clause 43. A non-transitory computer-readable medium storing computer-executable instructions that, when executed by a user equipment (UE), cause the UE to: transmit one or more provide capabilities messages to a location server, the one or more provide capabilities messages indicating at least a first set of capabilities of the UE to engage in a downlink radio frequency fingerprint (DL-RFFP) positioning procedure; and receive one or more positioning assistance data messages for the DL-RFFP positioning procedure from the location server, the one or more positioning assistance data messages based at least on the first set of capabilities.

Clause 44. The non-transitory computer-readable medium of clause 43, wherein the first set of capabilities is an initial set of capabilities of the UE to engage in the DL-RFFP positioning procedure.

Clause 45. The non-transitory computer-readable medium of any of clauses 43 to 44, further comprising computer-executable instructions that, when executed by the UE, cause the UE to: receive a first request capabilities message from the location server, the first request capabilities message requesting at least the first set of capabilities of the UE.

Clause 46. The non-transitory computer-readable medium of clause 45, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

Clause 47. The non-transitory computer-readable medium of clause 46, further comprising computer-executable instructions that, when executed by the UE, cause the UE to: receive a second request capabilities message from the location server, the second request capabilities message requesting a second set of capabilities of the UE based on the flag configuring the UE to wait for subsequent requests for specific capabilities of the UE related to the DL-RFFP positioning procedure.

Clause 48. The non-transitory computer-readable medium of any of clauses 43 to 47, further comprising computer-executable instructions that, when executed by the UE, cause the UE to: transmit a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

Clause 49. The non-transitory computer-readable medium of clause 48, wherein: the first set of capabilities of the UE comprises a flag indicating that the UE supports DL-RFFP positioning, and the second set of capabilities of the UE comprises all capabilities of the UE related to the DL-RFFP positioning procedure.

Clause 50. The non-transitory computer-readable medium of any of clauses 43 to 49, wherein the one or more provide capabilities messages includes a first flag indicating whether the UE is capable of using a network-provided machine learning model for the DL-RFFP positioning procedure.

Clause 51. The non-transitory computer-readable medium of clause 50, wherein the one or more provide capabilities messages includes a second flag indicating how the location server can retrieve capabilities of the UE to use the network-provided machine learning model.

Clause 52. The non-transitory computer-readable medium of clause 51, wherein: a first value of the second flag indicates that the capabilities of the UE to use the network-provided machine learning model are included in the one or more provide capabilities messages, and a second value of the second flag indicates that the capabilities of the UE to use the network-provided machine learning model are stored at a network entity other than the location server.

Clause 53. The non-transitory computer-readable medium of any of clauses 50 to 52, wherein the first set of capabilities indicates: a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

Clause 54. The non-transitory computer-readable medium of any of clauses 50 to 53, wherein the first set of capabilities indicates: a list of machine learning model formats supported by the UE, a maximum number of parameters for the network-provided machine learning model supported by the UE, one or more parameters related to inferences using the network-provided machine learning model, or any combination thereof.

Clause 55. The non-transitory computer-readable medium of clause 54, wherein the one or more parameters related to inferences using the network-provided machine learning model indicate: a list of features supported by the UE, a maximum inverse fast Fourier transform (IFFT) size supported by the UE, a maximum number of antenna pairs the UE is capable of processing, a maximum channel estimate window size supported by the UE, or any combination thereof.

Clause 56. The non-transitory computer-readable medium of any of clauses 50 to 55, further comprising computer-executable instructions that, when executed by the UE, cause the UE to: receive the network-provided machine learning model from the location server or a network entity other than the location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    transmitting one or more provide capabilities messages to a location server, the one or more provide capabilities messages indicating at least a first set of capabilities of the UE to engage in a downlink radio frequency fingerprint (DL-RFFP) positioning procedure and including a first flag indicating whether the UE is capable of using a network-provided machine learning model for the DL-RFFP positioning procedure, and wherein the first set of capabilities indicates:
        a list of machine learning model formats supported by the UE,
        a maximum number of parameters for the network-provided machine learning model supported by the UE,
        one or more parameters related to inferences using the network-provided machine learning model, or
        any combination thereof; and
    receiving one or more positioning assistance data messages for the DL-RFFP positioning procedure from the location server, the one or more positioning assistance data messages based at least on the first set of capabilities.

2. The method of claim 1, wherein the first set of capabilities is an initial set of capabilities of the UE to engage in the DL-RFFP positioning procedure.

3. The method of claim 1, further comprising:
receiving a first request capabilities message from the location server, the first request capabilities message requesting at least the first set of capabilities of the UE.

4. The method of claim 3, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

5. The method of claim 4, further comprising:
receiving a second request capabilities message from the location server, the second request capabilities message requesting a second set of capabilities of the UE based on the flag configuring the UE to wait for subsequent requests for specific capabilities of the UE related to the DL-RFFP positioning procedure.

6. The method of claim 1, further comprising:
transmitting a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

7. The method of claim 6, wherein:
the first set of capabilities of the UE comprises a flag indicating that the UE supports DL-RFFP positioning, and
the second set of capabilities of the UE comprises all capabilities of the UE related to the DL-RFFP positioning procedure.

8. The method of claim 1, wherein the one or more provide capabilities messages includes a second flag indicating how the location server can retrieve capabilities of the UE to use the network-provided machine learning model.

9. The method of claim 8, wherein:
a first value of the second flag indicates that the capabilities of the UE to use the network-provided machine learning model are included in the one or more provide capabilities messages, and
a second value of the second flag indicates that the capabilities of the UE to use the network-provided machine learning model are stored at a network entity other than the location server.

10. The method of claim 1, wherein the first set of capabilities indicates:
a maximum number of concurrent machine learning positioning instances supported by the UE,
downlink positioning reference signal (DL-PRS) resource capabilities related to the DL-RFFP positioning procedure,
DL-PRS resource processing capabilities related to the DL-RFFP positioning procedure, or
any combination thereof.

11. The method of claim 1, wherein the one or more parameters related to inferences using the network-provided machine learning model indicate:
a list of features supported by the UE,
a maximum inverse fast Fourier transform (IFFT) size supported by the UE,
a maximum number of antenna pairs the UE is capable of processing,
a maximum channel estimate window size supported by the UE, or
any combination thereof.

12. The method of claim 1, further comprising:
receiving the network-provided machine learning model from the location server or a network entity other than the location server.

13. A user equipment (UE), comprising:
a memory;
at least one transceiver; and
at least one processor communicatively coupled to the memory and the at least one transceiver, the at least one processor configured to:
transmit, via the at least one transceiver, one or more provide capabilities messages to a location server, the one or more provide capabilities messages indicating at least a first set of capabilities of the UE to engage in a downlink radio frequency fingerprint (DL-RFFP) positioning procedure and including a first flag indicating whether the UE is capable of using a network-provided machine learning model for the DL-RFFP positioning procedure, and wherein the first set of capabilities indicates:
a list of machine learning model formats supported by the UE,
a maximum number of parameters for the network-provided machine learning model supported by the UE,
one or more parameters related to inferences using the network-provided machine learning model, or
any combination thereof; and
receive, via the at least one transceiver, one or more positioning assistance data messages for the DL-RFFP positioning procedure from the location server, the one or more positioning assistance data messages based at least on the first set of capabilities.

14. The UE of claim 13, wherein the first set of capabilities is an initial set of capabilities of the UE to engage in the DL-RFFP positioning procedure.

15. The UE of claim 13, wherein the at least one processor is further configured to:
receive, via the at least one transceiver, a first request capabilities message from the location server, the first request capabilities message requesting at least the first set of capabilities of the UE.

16. The UE of claim 15, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

17. The UE of claim 16, wherein the at least one processor is further configured to:
receive, via the at least one transceiver, a second request capabilities message from the location server, the second request capabilities message requesting a second set of capabilities of the UE based on the flag configuring the UE to wait for subsequent requests for specific capabilities of the UE related to the DL-RFFP positioning procedure.

18. The UE of claim 13, wherein the at least one processor is further configured to:

transmit, via the at least one transceiver, a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

19. The UE of claim 18, wherein:
the first set of capabilities of the UE comprises a flag indicating that the UE supports DL-RFFP positioning, and
the second set of capabilities of the UE comprises all capabilities of the UE related to the DL-RFFP positioning procedure.

20. The UE of claim 13, wherein the one or more provide capabilities messages includes a second flag indicating how the location server can retrieve capabilities of the UE to use the network-provided machine learning model.

21. The UE of claim 20, wherein:
a first value of the second flag indicates that the capabilities of the UE to use the network-provided machine learning model are included in the one or more provide capabilities messages, and
a second value of the second flag indicates that the capabilities of the UE to use the network-provided machine learning model are stored at a network entity other than the location server.

22. The UE of claim 13, wherein the first set of capabilities indicates:
a maximum number of concurrent machine learning positioning instances supported by the UE,
downlink positioning reference signal (DL-PRS) resource capabilities related to the DL-RFFP positioning procedure,
DL-PRS resource processing capabilities related to the DL-RFFP positioning procedure, or
any combination thereof.

23. The UE of claim 13, wherein the one or more parameters related to inferences using the network-provided machine learning model indicate:
a list of features supported by the UE,
a maximum inverse fast Fourier transform (IFFT) size supported by the UE,
a maximum number of antenna pairs the UE is capable of processing,
a maximum channel estimate window size supported by the UE, or
any combination thereof.

24. The UE of claim 13, wherein the at least one processor is further configured to:
receive, via the at least one transceiver, the network-provided machine learning model from the location server or a network entity other than the location server.

25. A user equipment (UE), comprising:
means for transmitting one or more provide capabilities messages to a location server, the one or more provide capabilities messages indicating at least a first set of capabilities of the UE to engage in a downlink radio frequency fingerprint (DL-RFFP) positioning procedure and including a first flag indicating whether the UE is capable of using a network-provided machine learning model for the DL-RFFP positioning procedure, and wherein the first set of capabilities indicates:
a list of machine learning model formats supported by the UE,
a maximum number of parameters for the network-provided machine learning model supported by the UE,
one or more parameters related to inferences using the network-provided machine learning model, or
any combination thereof; and
means for receiving one or more positioning assistance data messages for the DL-RFFP positioning procedure from the location server, the one or more positioning assistance data messages based at least on the first set of capabilities.

26. The UE of claim 25, wherein the first set of capabilities is an initial set of capabilities of the UE to engage in the DL-RFFP positioning procedure.

27. The UE of claim 25, further comprising:
means for receiving a first request capabilities message from the location server, the first request capabilities message requesting at least the first set of capabilities of the UE.

28. The UE of claim 27, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

29. The UE of claim 28, further comprising:
means for receiving a second request capabilities message from the location server, the second request capabilities message requesting a second set of capabilities of the UE based on the flag configuring the UE to wait for subsequent requests for specific capabilities of the UE related to the DL-RFFP positioning procedure.

30. The UE of claim 25, further comprising:
means for transmitting a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

31. The UE of claim 30, wherein:
the first set of capabilities of the UE comprises a flag indicating that the UE supports DL-RFFP positioning, and
the second set of capabilities of the UE comprises all capabilities of the UE related to the DL-RFFP positioning procedure.

32. The UE of claim 25, wherein the one or more provide capabilities messages includes a second flag indicating how the location server can retrieve capabilities of the UE to use the network-provided machine learning model.

33. The UE of claim 32, wherein:
a first value of the second flag indicates that the capabilities of the UE to use the network-provided machine learning model are included in the one or more provide capabilities messages, and
a second value of the second flag indicates that the capabilities of the UE to use the network-provided machine learning model are stored at a network entity other than the location server.

34. The UE of claim 25, wherein the first set of capabilities indicates:
a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

35. The UE of claim 25, wherein the one or more parameters related to inferences using the network-provided machine learning model indicate:

a list of features supported by the UE, a maximum inverse fast Fourier transform (IFFT) size supported by the UE, a maximum number of antenna pairs the UE is capable of processing, a maximum channel estimate window size supported by the UE, or any combination thereof.

36. The UE of claim 25, further comprising:

means for receiving the network-provided machine learning model from the location server or a network entity other than the location server.

37. A non-transitory computer-readable medium storing computer-executable instructions that, when executed by a user equipment (UE), cause the UE to:

transmit one or more provide capabilities messages to a location server, the one or more provide capabilities messages indicating at least a first set of capabilities of the UE to engage in a downlink radio frequency fingerprint (DL-RFFP) positioning procedure and including a first flag indicating whether the UE is capable of using a network-provided machine learning model for the DL-RFFP positioning procedure, and wherein the first set of capabilities indicates:

a list of machine learning model formats supported by the UE, a maximum number of parameters for the network-provided machine learning model supported by the UE, one or more parameters related to inferences using the network-provided machine learning model, or any combination thereof; and receive one or more positioning assistance data messages for the DL-RFFP positioning procedure from the location server, the one or more positioning assistance data messages based at least on the first set of capabilities.

38. The non-transitory computer-readable medium of claim 37, wherein the first set of capabilities is an initial set of capabilities of the UE to engage in the DL-RFFP positioning procedure.

39. The non-transitory computer-readable medium of claim 37, further comprising computer-executable instructions that, when executed by the UE, cause the UE to:

receive a first request capabilities message from the location server, the first request capabilities message requesting at least the first set of capabilities of the UE.

40. The non-transitory computer-readable medium of claim 39, wherein the first request capabilities message includes a flag configuring the UE to provide all capabilities of the UE related to the DL-RFFP positioning procedure in the one or more provide capabilities messages or to wait for subsequent requests for specific capabilities of the UE related to the DL-RFFP positioning procedure.

41. The non-transitory computer-readable medium of claim 40, further comprising computer-executable instructions that, when executed by the UE, cause the UE to:

receive a second request capabilities message from the location server, the second request capabilities message requesting a second set of capabilities of the UE based on the flag configuring the UE to wait for subsequent requests for specific capabilities of the UE related to the DL-RFFP positioning procedure.

42. The non-transitory computer-readable medium of claim 37, further comprising computer-executable instructions that, when executed by the UE, cause the UE to:

transmit a second provide capabilities message to a network entity other than the location server, the second provide capabilities message including a second set of capabilities of the UE to engage in the DL-RFFP positioning procedure, wherein the second set of capabilities includes different capabilities than the first set of capabilities.

43. The non-transitory computer-readable medium of claim 42, wherein:

the first set of capabilities of the UE comprises a flag indicating that the UE supports DL-RFFP positioning, and the second set of capabilities of the UE comprises all capabilities of the UE related to the DL-RFFP positioning procedure.

44. The non-transitory computer-readable medium of claim 37, wherein the one or more provide capabilities messages includes a second flag indicating how the location server can retrieve capabilities of the UE to use the network-provided machine learning model.

45. The non-transitory computer-readable medium of claim 37, wherein:

a first value of the second flag indicates that the capabilities of the UE to use the network-provided machine learning model are included in the one or more provide capabilities messages, and a second value of the second flag indicates that the capabilities of the UE to use the network-provided machine learning model are stored at a network entity other than the location server.

46. The non-transitory computer-readable medium of claim 37, wherein the first set of capabilities indicates:

a maximum number of concurrent machine learning positioning instances supported by the UE, downlink positioning reference signal (DL-PRS) resource capabilities related to the DL-RFFP positioning procedure, DL-PRS resource processing capabilities related to the DL-RFFP positioning procedure, or any combination thereof.

47. The non-transitory computer-readable medium of claim 37, wherein the one or more parameters related to inferences using the network-provided machine learning model indicate:

a list of features supported by the UE, a maximum inverse fast Fourier transform (IFFT) size supported by the UE, a maximum number of antenna pairs the UE is capable of processing, a maximum channel estimate window size supported by the UE, or any combination thereof.

48. The non-transitory computer-readable medium of claim 37, further comprising computer-executable instructions that, when executed by the UE, cause the UE to:

receive the network-provided machine learning model from the location server or a network entity other than the location server.

* * * * *